(12) United States Patent  
Ooi

(10) Patent No.: US 7,480,722 B2
(45) Date of Patent: Jan. 20, 2009

(54) INFORMATION PROCESSING APPARATUS AND METHOD, RECORDING MEDIUM PRODUCT, AND PROGRAM

(75) Inventor: Junji Ooi, Kanagawa (JP)

(73) Assignee: Sony Corporation, Tokyo (JP)

(*) Notice: Subject to any disclaimer, the term of this patent is extended or adjusted under 35 U.S.C. 154(b) by 622 days.

(21) Appl. No.: 10/094,708

(22) Filed: Mar. 12, 2002

(65) Prior Publication Data

US 2003/0046402 A1    Mar. 6, 2003

(30) Foreign Application Priority Data

Mar. 15, 2001   (JP)   ............................. 2001-073360

(51) Int. Cl.
*G06F 15/16* (2006.01)
(52) U.S. Cl. ...................... 709/228; 709/227
(58) Field of Classification Search ................ 709/206, 709/207, 218, 236, 229, 200, 202, 223–230, 709/238, 219; 370/391, 401, 252, 355, 400; 237/7; 715/751; 340/7; 713/201, 168, 151, 713/176, 153, 162, 160; 379/230, 67; 707/104; 719/219; 726/15, 35
See application file for complete search history.

(56) References Cited

U.S. PATENT DOCUMENTS

| | | | | |
|---|---|---|---|---|
| 4,493,021 A | * | 1/1985 | Agrawal et al. ............. 709/236 |
| 4,881,263 A | * | 11/1989 | Herbison et al. ............ 713/162 |
| 4,894,822 A | * | 1/1990 | Buhrke et al. ............... 370/400 |
| 5,115,326 A | * | 5/1992 | Burgess et al. .............. 358/440 |
| 5,166,931 A | * | 11/1992 | Riddle ........................ 370/401 |
| 5,255,315 A | * | 10/1993 | Bushnell ..................... 379/230 |
| 5,621,727 A | * | 4/1997 | Vaudreuil ................... 370/401 |
| 5,668,880 A | * | 9/1997 | Alajajian .................... 370/342 |
| 5,684,951 A | * | 11/1997 | Goldman et al. ............... 726/6 |
| 5,714,943 A | * | 2/1998 | Rasor ......................... 340/7.1 |
| 5,892,903 A | * | 4/1999 | Klaus ......................... 713/201 |
| 5,903,559 A | * | 5/1999 | Acharya et al. ............. 370/355 |
| 5,903,652 A | * | 5/1999 | Mital .......................... 705/78 |
| 5,944,783 A | * | 8/1999 | Nieten ........................ 709/202 |

(Continued)

FOREIGN PATENT DOCUMENTS

EP    0 878 940    11/1998

(Continued)

OTHER PUBLICATIONS

[Appendix A] DNS Message Format and Resource Records www.serve.com/-~josh/books/tcpip/dnsbind/appa_01.htm.*

(Continued)

*Primary Examiner*—Thong H Vu
(74) *Attorney, Agent, or Firm*—Oblon, Spivak, McClelland, Maier & Neustadt, P.C.

(57) ABSTRACT

Communication connection for peer-to-peer communication is established as follows. One personal computer, which wants to commence communication, transmits an electronic mail attached with an IP address of one personal computer to another personal computer, which is a desired destination. Another personal computer opens the transmitted electronic mail and obtains the IP address attached to the electronic mail, thereby establishing the communication connection. Information necessary for establishing the communication connection in peer-to-peer communication can be easily acquired.

8 Claims, 20 Drawing Sheets

U.S. PATENT DOCUMENTS

| | | | | |
|---|---|---|---|---|
| 5,987,513 A * | 11/1999 | Prithviraj et al. | | 709/223 |
| 6,044,205 A * | 3/2000 | Reed et al. | | 709/201 |
| 6,055,236 A * | 4/2000 | Nessett et al. | | 370/389 |
| 6,061,796 A * | 5/2000 | Chen et al. | | 726/15 |
| 6,108,704 A | 8/2000 | Hutton et al. | | |
| 6,112,245 A * | 8/2000 | Araujo et al. | | 709/228 |
| 6,181,780 B1 * | 1/2001 | Finnigan | | 379/67.1 |
| 6,199,048 B1 * | 3/2001 | Hudetz et al. | | 705/23 |
| 6,222,859 B1 * | 4/2001 | Yoshikawa | | 370/522 |
| 6,249,811 B1 | 6/2001 | Kido | | |
| 6,275,829 B1 * | 8/2001 | Angiulo et al. | | 707/104.1 |
| 6,292,211 B1 * | 9/2001 | Pena | | 348/14.08 |
| 6,317,830 B1 * | 11/2001 | Stolz | | 713/168 |
| 6,321,267 B1 * | 11/2001 | Donaldson | | 709/229 |
| 6,353,852 B1 * | 3/2002 | Nestoriak et al. | | 709/206 |
| 6,360,254 B1 * | 3/2002 | Linden et al. | | 709/219 |
| 6,389,462 B1 * | 5/2002 | Cohen et al. | | 709/218 |
| 6,389,533 B1 * | 5/2002 | Davis et al. | | 713/162 |
| 6,430,595 B1 * | 8/2002 | Ferguson et al. | | 709/200 |
| 6,445,704 B1 * | 9/2002 | Howes et al. | | 370/392 |
| 6,496,928 B1 * | 12/2002 | Deo et al. | | 713/153 |
| 6,536,678 B2 * | 3/2003 | Pouchak | | 237/7 |
| 6,542,933 B1 * | 4/2003 | Durst et al. | | 709/229 |
| 6,557,037 B1 * | 4/2003 | Provino | | 709/227 |
| 6,654,795 B1 * | 11/2003 | Coile | | 709/219 |
| 6,658,469 B1 * | 12/2003 | Massa et al. | | 709/224 |
| 6,668,282 B1 * | 12/2003 | Booth, III et al. | | 709/224 |
| 6,668,320 B1 * | 12/2003 | Van Rijnsoever | | 713/151 |
| 6,728,767 B1 * | 4/2004 | Day et al. | | 709/223 |
| 6,731,308 B1 * | 5/2004 | Tang et al. | | 715/751 |
| 6,751,196 B1 * | 6/2004 | Hulyalkar et al. | | 370/252 |
| 6,760,752 B1 * | 7/2004 | Liu et al. | | 709/206 |
| 6,782,414 B1 * | 8/2004 | Xue et al. | | 709/206 |
| 6,792,615 B1 * | 9/2004 | Rowe et al. | | 725/37 |
| 6,798,782 B1 * | 9/2004 | Caronni et al. | | 370/409 |
| 6,829,631 B1 * | 12/2004 | Forman et al. | | 709/202 |
| 6,873,429 B2 * | 3/2005 | Matsuura | | 358/1.15 |
| 6,907,034 B1 * | 6/2005 | Begis | | 370/354 |
| 6,915,345 B1 * | 7/2005 | Tummala et al. | | 709/225 |
| 6,920,502 B2 * | 7/2005 | Araujo et al. | | 709/229 |
| 6,928,469 B1 * | 8/2005 | Duursma et al. | | 709/223 |
| 6,941,366 B2 * | 9/2005 | Antes et al. | | 709/224 |
| 6,950,946 B1 * | 9/2005 | Droz et al. | | 726/35 |
| 6,981,278 B1 * | 12/2005 | Minnig et al. | | 726/12 |
| 6,988,199 B2 * | 1/2006 | Toh et al. | | 713/170 |
| 6,990,514 B1 * | 1/2006 | Dodrill et al. | | 709/206 |
| 7,010,605 B1 * | 3/2006 | Dharmarajan | | 709/227 |
| 7,016,973 B1 * | 3/2006 | Sibal et al. | | 709/238 |
| 7,032,111 B1 * | 4/2006 | Ruutu et al. | | 713/160 |
| 7,039,048 B1 * | 5/2006 | Monta et al. | | 370/389 |
| 7,065,579 B2 * | 6/2006 | Traversat et al. | | 709/230 |
| 7,100,048 B1 * | 8/2006 | Czajkowski et al. | | 713/168 |
| 7,127,613 B2 * | 10/2006 | Pabla et al. | | 713/171 |
| 7,155,518 B2 * | 12/2006 | Forslow | | 709/227 |
| 7,161,941 B1 * | 1/2007 | Schmidl et al. | | 370/392 |
| 7,170,999 B1 * | 1/2007 | Kessler et al. | | 380/277 |
| 2001/0034769 A1 * | 10/2001 | Rast | | 709/206 |
| 2001/0034831 A1 * | 10/2001 | Brustoloni et al. | | 713/151 |
| 2002/0004898 A1 * | 1/2002 | Droge | | 713/151 |
| 2002/0007350 A1 * | 1/2002 | Yen | | 705/52 |
| 2002/0049610 A1 * | 4/2002 | Gropper | | 705/1 |
| 2002/0078466 A1 * | 6/2002 | Beyda | | 725/109 |
| 2002/0120849 A1 * | 8/2002 | McKinley et al. | | 713/176 |
| 2002/0135612 A1 * | 9/2002 | Royer et al. | | 345/741 |
| 2002/0143855 A1 * | 10/2002 | Traversat et al. | | 709/202 |
| 2002/0156896 A1 * | 10/2002 | Lin et al. | | 709/227 |
| 2003/0041155 A1 * | 2/2003 | Nelson et al. | | 709/230 |
| 2003/0177195 A1 * | 9/2003 | Han et al. | | 709/207 |
| 2004/0064511 A1 * | 4/2004 | Abdel-Aziz et al. | | 709/206 |
| 2004/0100648 A1 * | 5/2004 | Kulakowski | | 358/1.13 |
| 2004/0111601 A1 * | 6/2004 | Racz | | 713/150 |
| 2004/0148406 A1 * | 7/2004 | Shima | | 709/228 |
| 2004/0243837 A1 * | 12/2004 | Fredette et al. | | 713/201 |
| 2005/0044423 A1 * | 2/2005 | Mellmer et al. | | 713/201 |
| 2006/0031162 A1 * | 2/2006 | Brundage et al. | | 705/50 |
| 2007/0136480 A1 * | 6/2007 | Stephenson et al. | | 709/227 |

FOREIGN PATENT DOCUMENTS

JP            10-304010        11/1998

OTHER PUBLICATIONS

Destination lists (AB); www.caida.org/~broido/dest/dest.html.*
Destination lists—Cheswick and traceroute; www.caida.org/~broido/ches/ches.html.*

* cited by examiner

INFORMATION PROCESSING APPARATUS AND METHOD, RECORDING MEDIUM PRODUCT, AND PROGRAM

BACKGROUND OF THE INVENTION

1. Field of the Invention

The present invention relates to an information processing apparatus and method, a recording medium product, and a program. More particularly, the present invention relates to an information processing apparatus and method, a recording medium product, and a program, by which information necessary for establishing communication connection can be acquired with simple procedures.

2. Description of the Related Art

There has been developed a communication system (called a peer-to-peer communication system) in which terminals interconnected via a network communicate with each other directly without intervention of a dedicated server.

In a conventional peer-to-peer communication system, however, it is required to acquire information (e.g., an IP address of the destination) from a dedicated server, for example, the information being registered in advance for establishing communication connection. As an alternative, one source terminal may ask an IP address of the other destination terminal by telephone. Anyway, information necessary for establishing communication connection must be acquired through troublesome procedures.

SUMMARY OF THE INVENTION

In view of the state of the art set forth above, it is an object of the present invention to enable information necessary for establishing communication connection to be acquired with simple procedures.

According to a first aspect of the present invention, there is provided an information processing apparatus for transmitting a predetermined message to another information processing apparatus via a network by utilizing an address of aforesaid another information processing apparatus on the network, the information processing apparatus comprising a describing unit for describing an address of the information processing apparatus itself on the network in a predetermined file; and a transmitting unit for transmitting, to aforesaid another information processing apparatus, a message attached with the file, in which the address of the information processing apparatus itself is described, for establishing communication connection to perform communication between aforesaid another information processing apparatus and the information processing apparatus itself.

Also, there is provided an information processing method used in an information processing apparatus for transmitting a predetermined message to another information processing apparatus via a network by utilizing an address of aforesaid another information processing apparatus on the network, the information processing method comprising the steps of a describing step of describing an address of the information processing apparatus itself on the network in a predetermined file; and a transmitting step of transmitting, from the information processing apparatus to aforesaid another information processing apparatus, a message attached with the file, in which the address of the information processing apparatus itself is described, for establishing communication connection to perform communication between aforesaid another information processing apparatus and the information processing apparatus itself.

Further, there is provided a recording medium product on which a computer-readable program is recorded, the program being used with an information processing apparatus for transmitting a predetermined message to another information processing apparatus via a network by utilizing an address of aforesaid another information processing apparatus on the network, the program comprising a describing step of describing an address of the information processing apparatus itself on the network in a predetermined file; and a transmitting step of transmitting, from the information processing apparatus to aforesaid another information processing apparatus, a message attached with the file, in which the address of the information processing apparatus itself is described, for establishing communication connection to perform communication between aforesaid another information processing apparatus and the information processing apparatus itself.

Still further, there is provided a program used with an information processing apparatus for transmitting a predetermined message to another information processing apparatus via a network by utilizing an address of aforesaid another information processing apparatus on the network, the program causing a computer to execute a process comprising a describing step of describing an address of the information processing apparatus itself on the network in a predetermined file; and a transmitting step of transmitting, from the information processing apparatus to aforesaid another information processing apparatus, a message attached with the file, in which the address of the information processing apparatus itself is described, for establishing communication connection to perform communication between aforesaid another information processing apparatus and the information processing apparatus itself.

According to a second aspect of the present invention, there is provided an information processing apparatus for receiving a predetermined message, which is transmitted from another information processing apparatus via a network by utilizing an address of aforesaid another information processing apparatus on the network, the information processing apparatus comprising a receiving unit for receiving a message transmitted from aforesaid another information processing apparatus via the network, the message being attached with a file in which the address of aforesaid another information processing apparatus is described; and an establishing unit for establishing communication connection in accordance with the address of aforesaid another information processing apparatus, which is described in the file attached to the message, to perform communication with aforesaid another information processing apparatus.

Also, there is provided an information processing method used in an information processing apparatus for receiving a predetermined message, which is transmitted from another information processing apparatus via a network by utilizing an address of aforesaid another information processing apparatus on the network, the information processing method comprising a receiving step of receiving a message transmitted from aforesaid another information processing apparatus via the network, the message being attached with a file in which the address of aforesaid another information processing apparatus is described; and an establishing step of establishing communication connection in accordance with the address of aforesaid another information processing apparatus, which is described in the file attached to the message, to perform communication with aforesaid another information processing apparatus.

Further, there is provided a recording medium product on which a computer-readable program is recorded, the program being used with an information processing apparatus for receiving a predetermined message, which is transmitted from another information processing apparatus via a network by utilizing an address of aforesaid another information processing apparatus on the network, the program comprising a receiving step of receiving a message transmitted from aforesaid another information processing apparatus via the network, the message being attached with a file in which the address of aforesaid another information processing apparatus is described; and an establishing step of establishing communication connection in accordance with the address of aforesaid another information processing apparatus, which is described in the file attached to the message, to perform communication with aforesaid another information processing apparatus.

Still further, there is provided a program used with an information processing apparatus for receiving a predetermined message, which is transmitted from another information processing apparatus via a network by utilizing an address of aforesaid another information processing apparatus on the network, the program causing a computer to execute a process comprising a receiving step of receiving a message transmitted from aforesaid another information processing apparatus via the network, the message being attached with a file in which the address of aforesaid another information processing apparatus is described; and an establishing step of establishing communication connection in accordance with the address of aforesaid another information processing apparatus, which is described in the file attached to the message, to perform communication with aforesaid another information processing apparatus.

With the information processing apparatus and method and the program according to a first aspect of the present invention, the information processing apparatus describes its own address on a network in a predetermined file and transmits, to another information processing apparatus, a message attached with the file, in which its own address is described, for establishing communication connection to perform communication with another information processing apparatus in accordance with its own address without intervention of a dedicated server. It is therefore possible to easily obtain the address necessary for establishing the communication connection.

With the information processing apparatus and method and the program according to a second aspect of the present invention, the information processing apparatus receives a message transmitted from another information processing apparatus via a network, the message being attached with a file in which an address of another information processing apparatus is described, and establishes communication connection in accordance with the address of another information processing apparatus, which is described in the file attached to the received message, to perform communication with another information processing apparatus without intervention of a dedicated server. It is therefore possible to easily establish the communication connection.

DESCRIPTION OF THE PREFERRED EMBODIMENTS

Figure 1:
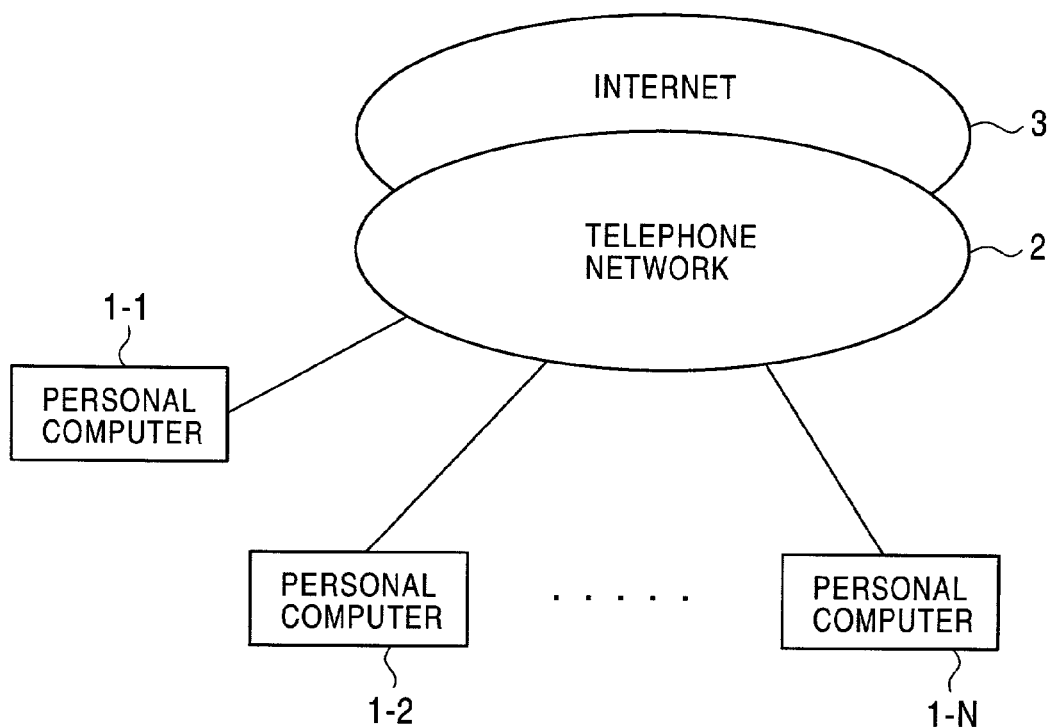
FIG. 1 is a diagram showing one example of configuration of a communication system to which the present invention is applied.

FIG. 1 shows one example of configuration of a communication system to which the present invention is applied.

A number N of personal computers 1-1 to 1-N (referred to simply as "personal computer 1" hereinafter when it is not required to distinguish the individual computers from each other) are connected to the Internet 3 via a telephone network 2 and respective specific Internet providers (not shown).

The personal computers 1 are each able to transmit and receive an electronic mail among them via the Internet 3. To that end, IP addresses of the personal computers 1 are registered in respective specific electronic mail servers (not shown) connected to the Internet 3.

Figure 2:
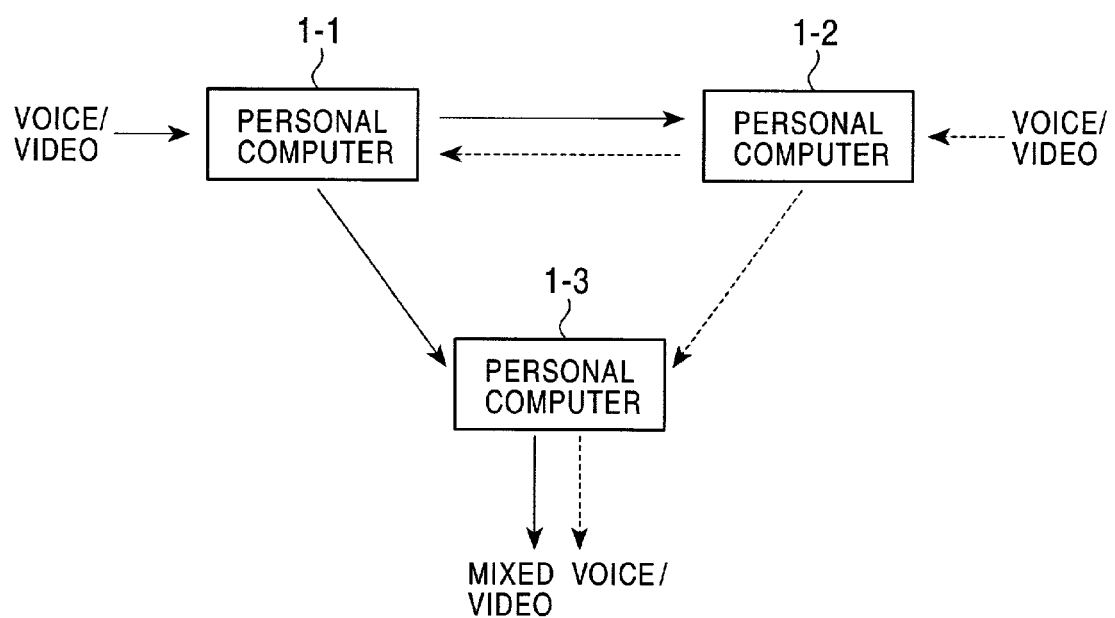
FIG. 2 is a block diagram for explaining peer-to-peer communication.

The personal computers 1 are also each able to execute peer-to-peer communication via, e.g., the telephone network 2. With the peer-to-peer communication, as shown in FIG. 2 by way of example, voice and video taken in by the personal computer 1-1 are directly supplied to each of the personal computers 1-2 and 1-3 without intervention of a dedicated server, while voice and video taken in by the personal computer 1-2 are directly supplied to each of the personal computers 1-1 and 1-3 without intervention of a dedicated server. In the personal computer 1-3, voices and videos supplied from the personal computers 1-1 and 1-2 are mixed and outputted (reproduced).

In that peer-to-peer communication, communication connection is established in such a manner that the personal computer 1-1, for example, which wants to commence communication, transmits an electronic mail attached with the IP address of the personal computer 1-1 to, for example, the personal computer 1-2 which is a desired destination, and the personal computer 1-2 opens the electronic mail to obtain the IP address attached to the electronic mail. Stated otherwise, in the communication system to which the present invention is applied, communication connection for the peer-to-peer communication is established by utilizing the IP address already registered in the Internet 3 (exactly speaking, the IP address registered in the electronic mail server).

Further, if at least one of the personal computers 1, among which communication is to be exchanged, has a predetermined function module (referred to as an "additional function module" hereinafter), each of those personal computers 1 is able to perform communication based on the additional function module.

In the peer-to-peer communication between the personal computers 1-1 and 1-2, for example, even when the personal computer 1-1 possesses the additional function module, but the personal computer 1-2 does not posses it, the personal computers 1-1 and 1-2 are able to perform peer-to-peer communication based on the additional function module.

FIGS. 3 to 6 show an external appearance of the personal computer 1-1.

Figure 3:
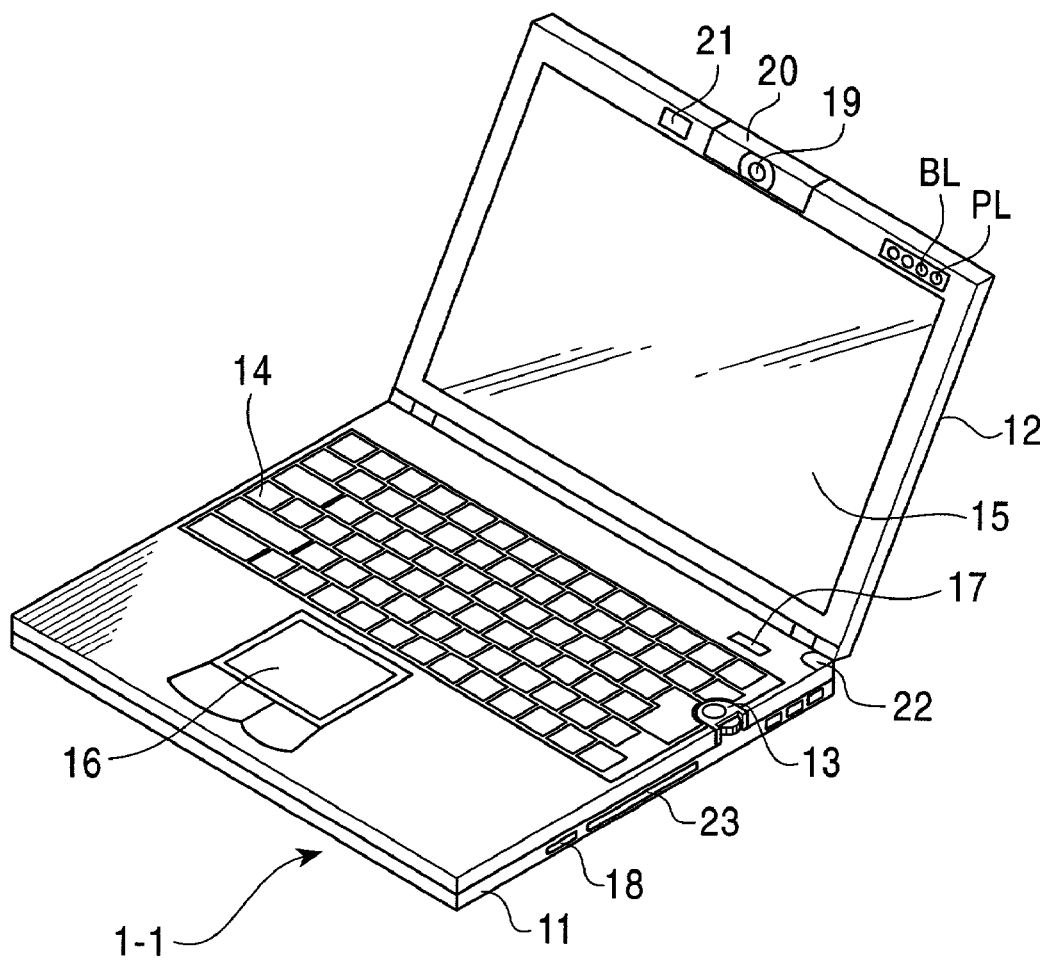
FIG. 3 is a perspective view showing one example of an external appearance of a personal computer 1-1.
Figure 4:
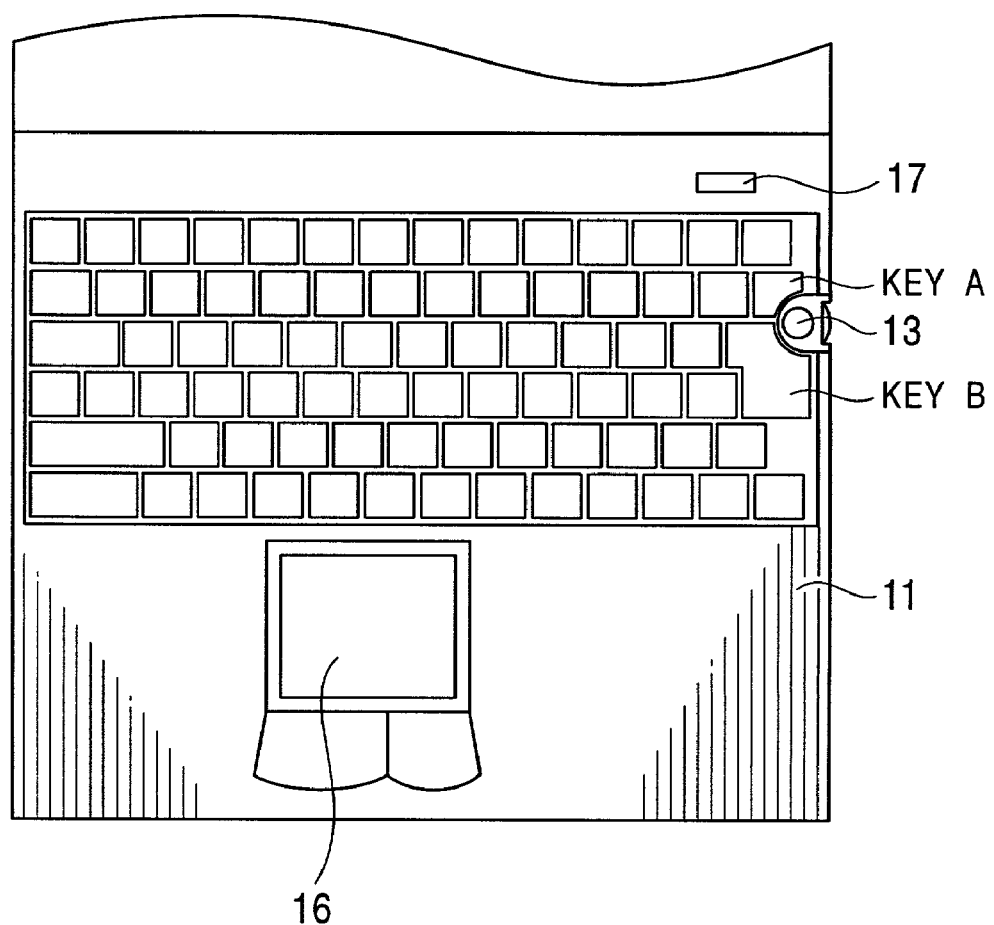
FIG. 4 is a partial plan view showing one example of the external appearance of the personal computer 1-1.
Figure 5:
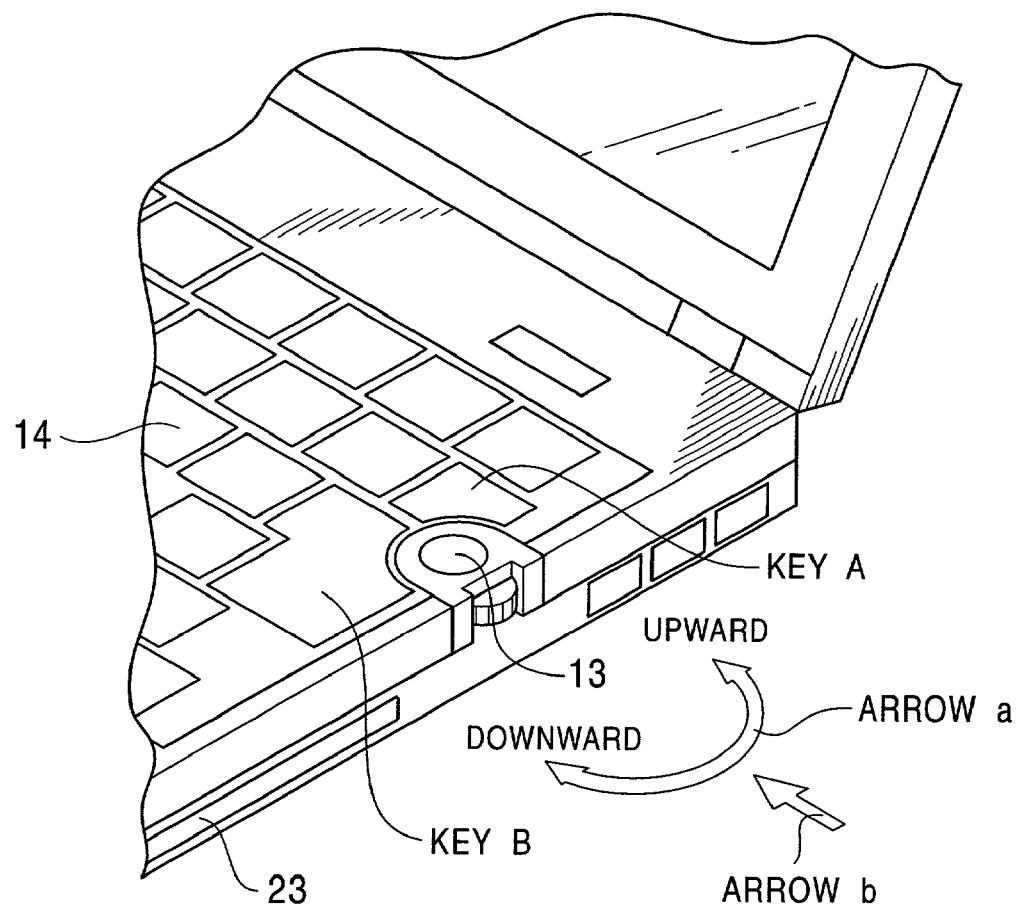
FIG. 5 is a partial enlarged view showing one example of the external appearance of the personal computer 1-1.
Figure 6:
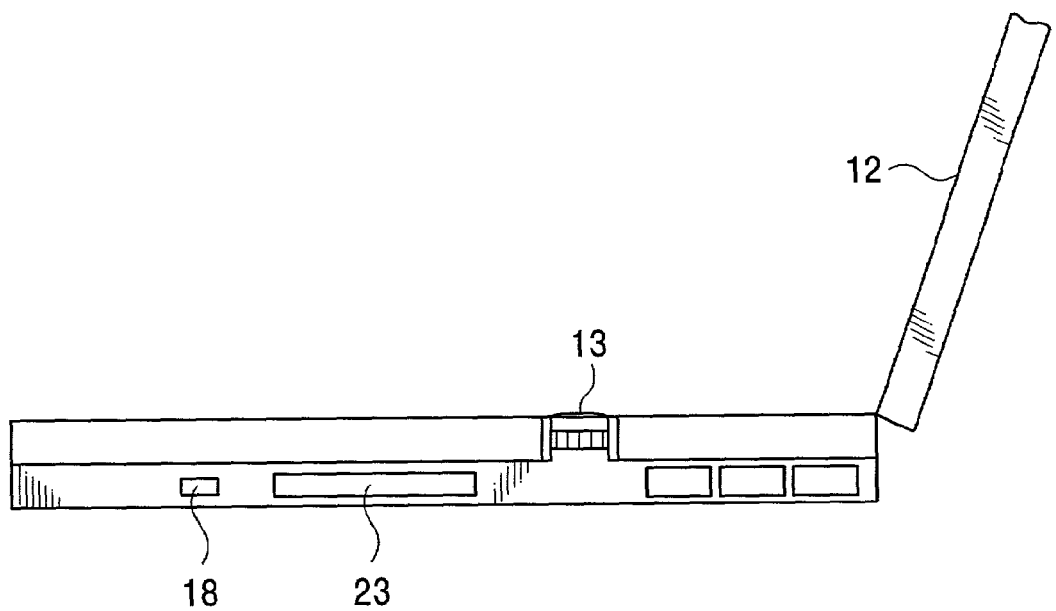
FIG. 6 is a side view showing one example of the external appearance of the personal computer 1-1.

The personal computer 1-1 basically comprises a main body 11 and a display unit 12 joined to the main body 11 in a manner being able to freely open and close. FIG. 3 is a perspective view showing the external appearance of the personal computer 1-1 in a state in which the display unit 12 is opened with respect to the main body 11. FIG. 4 is a partial plan view of the main body 11, and FIG. 5 is an enlarged view of a jog dial 13 (described later) provided on the main body 11. FIG. 6 is a side view of the jog dial 13 provided on the main body 11.

The main body 11 includes, on its upper surface, a keyboard 14 manipulated when inputting various kinds of characters and symbols, a touch pad 16 as a pointing device manipulated, for example, when moving a pointer (mouse cursor) displayed on an LCD 15, and a power switch 17. Also, the jog dial 13, an IEEE 1394 port 18, etc. are provided at the lateral side of the main body 11. A stick-type pointing device may be provided instead of the touch pad 16.

The display unit 12 includes, on the front side, an LCD (Liquid Crystal Display) 15 for displaying an image. A set of LED lamps, such as a power lamp PL, a battery lamp BL and, if necessary, a message lamp ML (not shown), are provided at an upper right corner of the display unit 12. Further, an image pickup unit 20 including a CCD video camera 19, which comprises CCDs (solid-state image pickup devices), and a microphone 21 are provided in an upper central area of the display unit 12. A shutter button 22 for operating the CCD video camera 19 is provided at an upper right corner of the main body 11, as viewed in FIG. 3.

The image pickup unit 20 is rotatably mounted to the display unit 12. A user can rotate the image pickup unit 20, for example, from a position in which the CCD video camera 19 is able to pick up an image of the user operating the personal computer 1-1 to a position in which it is able to pick up an image in the same direction as the eyes of the user operating the personal computer 1-1.

The jog dial 13 is mounted, for example, between two keys A and B, which are arranged at the right side end of the keyboard 14 on the main body 11 as viewed in FIG. 4, such that an upper surface of the jog dial 13 is substantially flush with upper surfaces of the keys A and B. The jog dial 13 causes predetermined processing (e.g., processing to scroll a screen) to be executed when it is rotated as indicated by an arrow a in FIG. 5, and causes another predetermined processing (e.g., processing to confirm selection of an icon) to be executed when it is moved as indicated by an arrow b in FIG. 5.

The IEEE (Institute of Electrical and Electronics Engineers) 1394 port 18 has a structure in accordance with the standards specified in the IEEE 1394. A cable in accordance with the standards specified in the IEEE 1394 is connected to the IEEE 1394 port 18.

One example of an internal configuration of the personal computer 1-1 will be described below with reference to FIG. 7.

A central processing unit (CPU) 51 is constituted by, e.g., a Pentium (trade name) processor made by Intel Corp., and is connected to a host bus 52. A bridge 53 (so-called north bridge) is also connected to the host bus 52. The bridge 53 has an AGP (Accelerated Graphics Port) 50 and is connected to a PCI (Peripheral Component Interconnect/Interface) bus 56.

The bridge 53 is constituted by, e.g., an AGP Host Bridge Controller 400BX made by Intel Corp., and controls the CPU 51, a RAM (Random-Access Memory) 54 (so-called main memory), etc. Also, the bridge 53 controls a video controller 57 via the AGP 50. Note that the bridge 53 and another bridge (so-called south bridge (PCI-ISA Bridge)) 58 constitute the so-called chip set.

Further, the bridge 53 is connected to a cache memory 55. The cache memory 55 is constituted by a memory capable of executing write or read operation at a higher rate than the RAM 54 such as a SRAM (Static RAM), and caches (temporarily stores) a program or data used by the CPU 51.

The CPU 51 includes therein a primary cache, which is controlled by the CPU 51 itself and is able to operate at a higher rate than the cache memory 55.

The RAM 54 is constituted by, e.g., a DRAM (Dynamic RAM), and stores programs executed by the CPU 51 or data necessary for the operation of the CPU 51. Specifically, the RAM 54 stores, for example, an electronic mail program 54A, an autopilot program 54B, a jog-dial status monitoring program 54C, a jog dial driver 54D, an operating system (OS) 54E, a communication program 54F, an additional function module 54G, and other application programs 54H, which are each loaded from a HDD 67 at predetermined timing.

The electronic mail program 54A is a program for transmitting and receiving a communication text (electronic mail) via a modem 75, the telephone network 2, the Internet provider, the electronic mail server, and the Internet 3.

The autopilot program 54B is a program for executing a plurality of preset processes (or programs) and so on successively in a preset sequence.

The jog-dial status monitoring program 54C receives, from each of the above-mentioned application programs, a notice indicating whether the relevant program corresponds to the jog dial 13. When the relevant program corresponds to the jog dial 13, the jog-dial status monitoring program 54C displays, on the LCD 15, what can be performed upon manipulation of the jog dial 13.

Also, the jog-dial status monitoring program 54C detects an event of the jog dial 13 (e.g., rotation of the jog dial 13 in the direction indicated by the arrow a in FIG. 5 or push of the jog dial 13 in the direction indicated by the arrow b in FIG. 5), and then executes processing corresponding to the detected event. The jog dial driver 54D executes various functions depending on manipulation made on the jog dial 13.

The OS (operating system) 54E is a program for controlling the basic operation of the computer, which is represented by, e.g., Windows 95 (trade name) and Windows 98 (trade name) released from Microsoft Corporation, or Mac OS (trade name) released from Apple Computer Inc.

The communication program 54F executes processing for the peer-to-peer communication. Also, for establishing communication connection in the peer-to-peer communication, the communication program 54F controls the electronic mail program 54A so as to transmit an electronic mail, to which the IP address of the personal computer 1-1 is attached, to the counterpart of the communication, or to acquire the IP address from a predetermined electronic mail transmitted from the counterpart of the communication.

Further, the communication program 54F controls the additional function module 54G and executes communication based on the function of the additional function module 54G.

The additional function module 54G executes predetermined processing (described later) in accordance with the control performed by the communication program 54F.

The video controller 57 is connected to the bridge 53 via the AGP 50. After receiving data (image data or text data) supplied from the CPU 51 via both the AGP 50 and the bridge 53, the video controller 57 produces image data corresponding to the received data and then stores, in a built-in video memory, the produced image data or the received data as it is. Furthermore, the video controller 57 controls the LCD 15 in the display unit 12 to display an image corresponding to the image data stored in the video memory.

In addition, the video controller 57 supplies video data, which is supplied from the CCD video camera 19, to the RAM 54 via the PCI bus 56.

A sound controller 64 is connected to the PCI bus 56. The sound controller 64 takes in voices from the microphone 21, produces data corresponding to the voices, and outputs the produced data to the RAM 54. Also, sound controller 64 drives the speaker 65 to output voices from the speaker 65.

Further, the modem 75 is connected to the PCI bus 56. The modem 75 is connected to the telephone network 2 and executes communication processing via the telephone network 2 or the Internet 3.

A PC-card slot interface 111 is connected to the PCI bus 56 for supplying data supplied from an interface card 112, which is inserted in a slot 23, to the CPU 51 or the RAM 54 and for outputting data supplied from the CPU 51 to the interface card 112. A drive 113 is connected to the PCI bus 56 via the PC-card slot interface 111 and the interface card 112.

The drive 113 reads data recorded on a loaded one of a magnetic disk 121, an optical disk 122, a magneto-optical disk 123, and a semiconductor memory 124, and supplies the read data to the RAM 54 via the interface card 112, the PC-card slot interface 111 and the PCI bus 56.

Further, the bridge (so-called south bridge) 58 is connected to the PCI bus 56. The bridge 58 is constituted by, e.g., PIIX4E made by Intel Corp., and includes an IDE (Integrated Drive Electronics) controller/configuration register 59, an IDE interface 61, a USB interface 68, etc. The bridge 58 executes various kinds of I/O (Input/Output) control, such as control of devices connected to an IDE bus 62 and devices connected via an ISA/EIO (Industry Standard Architecture/Extended Input Output) bus 63 or an I/O interface 69.

The IDE controller/configuration register 59 comprises two IDE controllers, called a primary IDE controller and a secondary IDE controller, a configuration register, etc. (not shown).

The HDD 67 is connected to the primary IDE controller via the IDE bus 62. Also, when the so-called IDE device (not shown), such as a CD-ROM drive and a HDD, is inserted in another IDE bus, the inserted IDE bus is electrically connected to the secondary IDE controller.

The HDD 67 stores therein, for example, an electronic mail program 67A, an autopilot program 67B, a jog-dial status monitoring program 67C, a jog dial driver 67D, an OS 67E, a communication program 67F, an additional function module 67G, and other application programs 67H.

Those programs from the electronic mail program 67A to the other application programs 67H, stored in the HDD 67, are loaded in the RAM 54 as required.

Also, the I/O interface 69 is connected to the ISA/EIO bus 63. The I/O interface 69 is constituted by an embedded controller. Inside the I/O interface 69, a ROM 70, a ROM 71 and a CPU 72 are connected to each other.

The ROM 70 stores therein beforehand, for example, an IEEE 1394 interface program 70A, an LED control program 70B, a touch-pad input monitoring program 70C, a key input monitoring program 70D, a wakeup program 70E, a jog-dial status monitoring program 70F.

The IEEE 1394 interface program 70A transmits and receives data (packet-contained data) in accordance with the standards of IEEE 1394 via the IEEE 1394 port 18. The LED control program 70B executes control for illumination of the set of LED lamps, such as the power lamp PL, the battery lamp BL, and the message lamp ML that is provided if needed. The touch-pad input monitoring program 70C is a program for monitoring an input from the touch pad 16 corresponding to manipulation made by the user.

The key input monitoring program 70D is a program for monitoring an input from the keyboard 14 or any other key switch. The wakeup program 70E is a program for managing a power source of each of chips constituting the personal computer 1-1. More specifically, based on data indicating the current time and supplied from a timer circuit (not shown) in the bridge 58, the key input monitoring program 70D checks whether the preset time is reached, and starts up predetermined processing (or a program) when the preset time is reached. The jog-dial status monitoring program 70F is a program for monitoring at all times whether a rotary encoder of the jog dial 13 is rotated, and whether the jog dial 13 is pushed.

Further, a BIOS (Basic Input/Output System) 70G is written in the ROM 70. The BIOS 70G controls transfer (input/output) of data between the OS or the application program and the peripheral unit (such as the touch pad 16, the keyboard 14 or the HDD 67).

The RAM 71 includes registers 71A to 71F, such as registers for LED control, touch-pad input status, key input status and preset time, an I/O register for monitoring the jog dial status, and an IEEE 1394 I/F register. For example, when the jog dial 13 is pushed to start up the electronic mail program 54A, a predetermined value is loaded in the LED control register and illumination of the message lamp ML is controlled depending on the loaded value. Also, upon the jog dial 13 being pushed, a specific manipulated-key flag is loaded in the key input status register. Predetermined time of day is set in the preset time register corresponding to manipulation made on, e.g., the keyboard 14 by the user.

Further, the jog dial 13, the touch pad 16, the keyboard 14, the IEEE 1394 port 18, the shutter button 22 and so on are connected to the I/O interface 69 via respective connectors (not shown). The I/O interface 69 outputs, to the ISA/EIO bus 63, a signal corresponding to manipulation made on each of the jog dial 13, the touch pad 16, the keyboard 14 and the shutter button 22. Also, the I/O interface 69 controls transmission and reception of data with respect to a unit connected to the I/O interface 69 via the IEEE 1394 port 18. In addition, the power lamp PL, the battery lamp BL, the message lamp ML, a power control circuit 73, and other LED lamps are connected to the I/O interface 69.

The power control circuit 73 is connected to a built-in battery 74 or an AC power source for supplying necessary power to each block and controlling charging of the built-in battery 74 or a second battery for any peripheral unit. Also, the I/O interface 69 monitors the power switch 17 that is manipulated to turn on or off the power.

Even in the power-off state, the I/O interface 69 executes the above-mentioned programs from the IEEE 1394 interface program 70A to the jog-dial status monitoring program 70F based on an internal power source. In other words, those programs from the IEEE 1394 interface program 70A to the jog-dial status monitoring program 70F are operating at all times.

Accordingly, even when the power switch 17 is turned off and the CPU 51 is not executing the OS 54E, the I/O interface 69 executes the jog-dial status monitoring program 70F. Hence, when the jog dial 13 is pushed, e.g., in the power saving mode or in the power-off state, the personal computer 1-1 starts up processing predetermined software or script file that has been set in advance.

Thus, in the personal computer 1-1, there is no need of providing dedicated key because the jog dial 13 has the programmable power key (PPK) function.

The other personal computers 1-2 to 1-N also have basically the same configuration as the personal computer 1-1, and therefore illustration and description of the other computer's configuration are not omitted here.

Processing procedures for establishing communication connection for the peer-to-peer communication will be described below in connection with, by way of example, the case in which the personal computer 1-1 wants to make the peer-to-peer communication with the personal computer 1-2.

Figure 8:
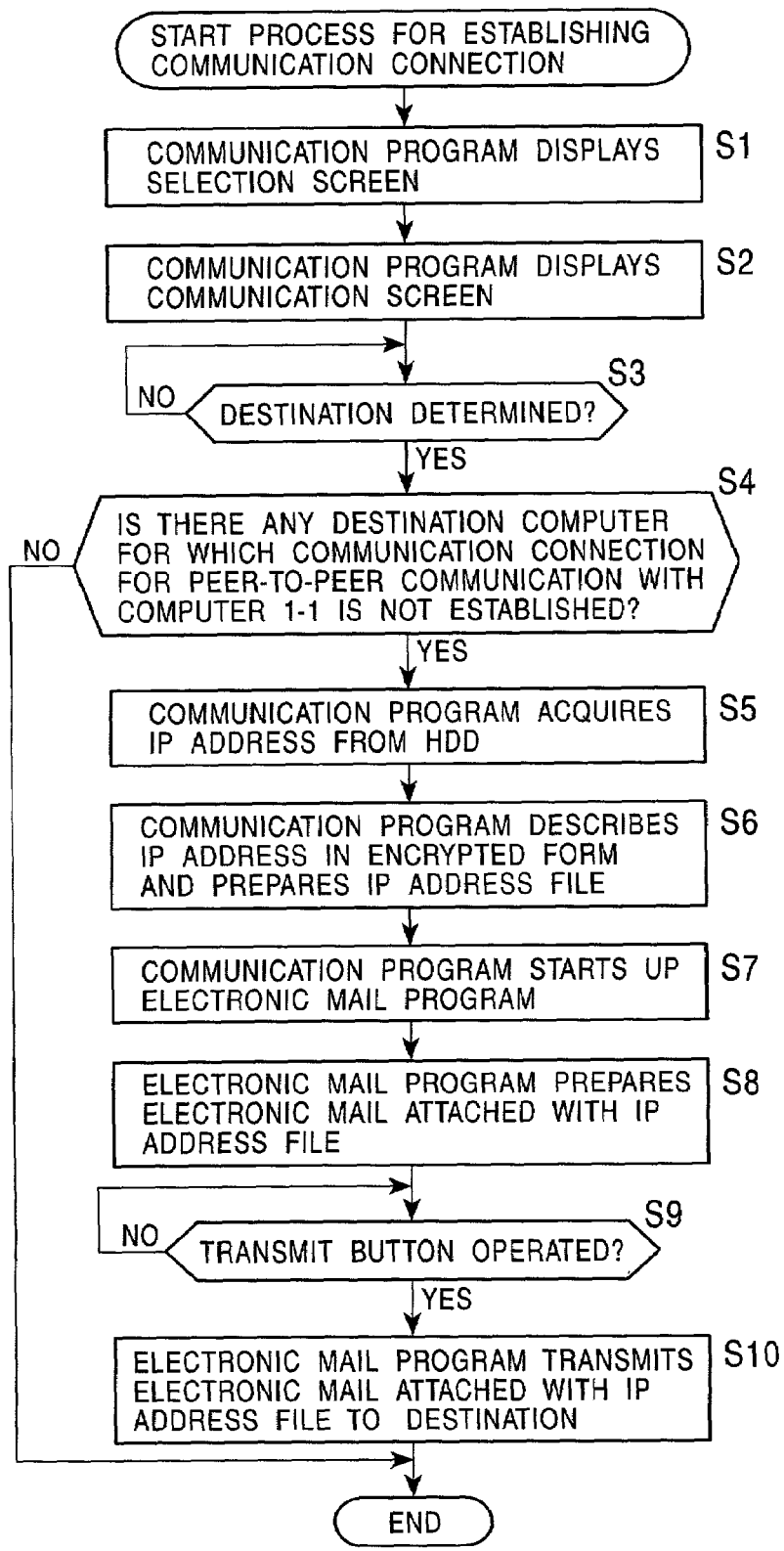
FIG. 8 is a flowchart for explaining the operation of the personal computer 1-1 for establishing communication connection in peer-to-peer communication.

The operation of the personal computer 1-1, which wants to make the peer-to-peer communication, is first described with reference to a flowchart of FIG. 8.

Figure 9:
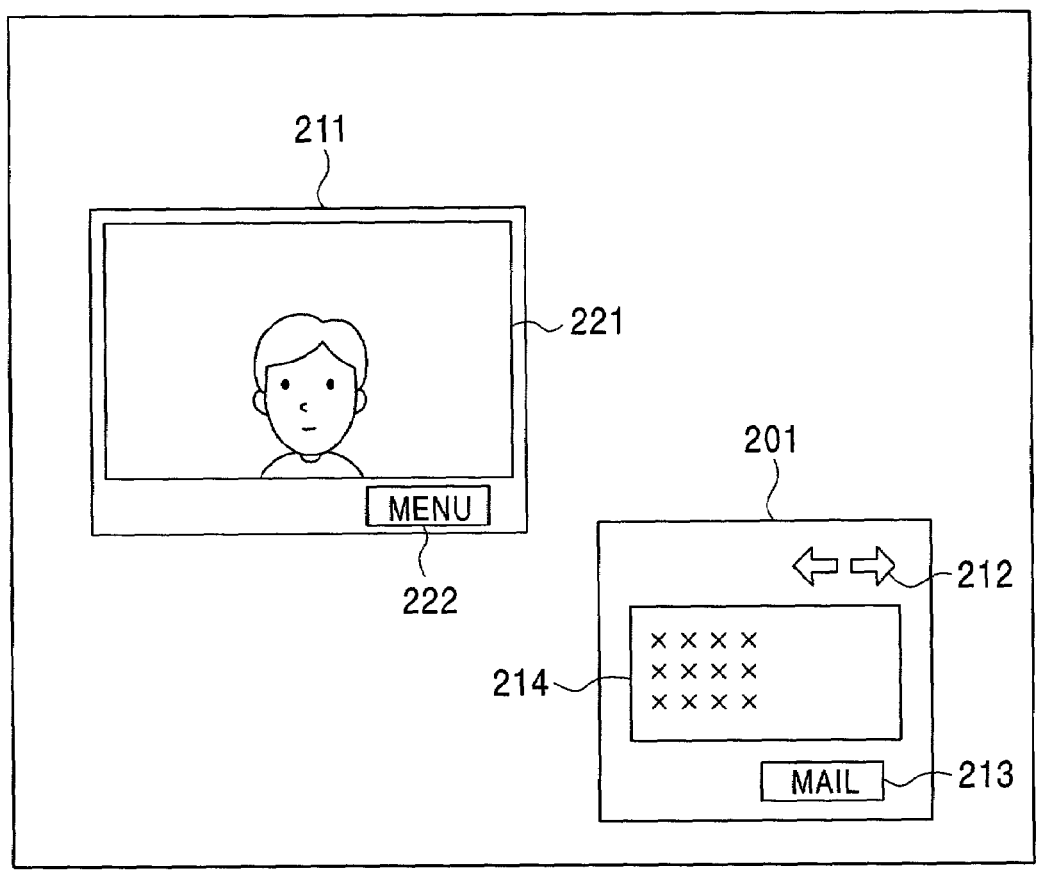
FIG. 9 shows one display example on an LCD of the personal computer 1-1.

In step S1, the CPU 51 of the personal computer 1-1 executes the communication program 54F for controlling the video controller 57 so that a screen (referred to as a "selection screen" hereinafter) 201 on which the destination in the peer-to-peer communication is selected, shown in FIG. 9, is displayed on the LCD 15.

The selection screen 201 includes a display area 214 in which the IP addresses, etc. of the personal computers 1-2 to 1-N are displayed as destination candidates in the peer-to-peer communication, buttons 212 manipulated when changing over items displayed in the display area 214, and a button 213 manipulated when selecting, the destination in the peer-to-peer communication, any of the personal computers 1 having the IP addresses displayed in the display area 214.

By dividing the IP addresses, etc. of the personal computers 1-2 to 1-N into predetermined groups before storing them in the HDD 67, it is possible to display the IP addresses, etc. of the personal computers 1-2 to 1-N in the display area 214 in units of a group and to select the destination for each group.

It is assumed that a communication screen 211 shown in FIG. 9 is not yet displayed on the LCD 15 at that time.

Then, in step S2, the CPU 51 (communication program 54F) of the personal computer 1-1 displays, on the LCD 15, the communication screen 211 representing a user state of the personal computer 1-1 as shown in FIG. 9 (in an example of FIG. 9, the communication screen 211 is displayed on the upper left side in an oblique relation to the selection screen 201).

The communication screen 211 includes a display area 221 in which an image picked up by the CCD video camera 19 (e.g., an image of the face of the user operating the personal computer 1-1) is displayed, and a button 222 manipulated when changing over items displayed in the display area 221.

In step S3, the communication program 54F waits until the button 213 on the selection screen 201 is manipulated and the destination in the peer-to-peer communication is decided. Upon the destination being decided, the process flow proceeds to step S4. Note that, in the following description, the personal computer 1 selected as the destination in the peer-to-peer communication is referred to as a "destination personal computer".

In this example, the button 213 is manipulated when the IP address, etc. of the personal computer 1-2 is displayed in the display area 214 of the selection screen 201, whereby the personal computer 1-2 is selected as the destination personal computer.

In step S4, the communication program 54F determines whether there is any destination personal computer for which communication connection for the peer-to-peer communication with the personal computer 1-1 is not established at the current time. If there is such a destination personal computer, the process flow proceeds to step S5.

Since communication connection for the peer-to-peer communication is not yet established between the personal computers 1-1 and 1-2 at that time, the process flow proceeds to step S5.

In step S5, the communication program 54F acquires the IP address of the personal computer 1-1 from the HDD 67.

Then, in step S6, the communication program 54F encrypts the IP address of the personal computer 1-1 and the encrypted address in a predetermined file. Subsequently, the communication program 54F stores, in the HDD 67, the file (referred to as an "IP address file" hereinafter) in which the encrypted IP address is written.

In step S7, the communication program 54F starts up the electronic mail program 54A.

Next, in step S8, the electronic mail program 54A prepares an electronic mail, which is attached with the IP address file stored in the HDD 67 in step S6 and is destined for the destination personal computer for which the communication connection for the peer-to-peer communication has been determined in step S4 as being not established, and then displays the prepared electronic mail on the LCD 15.

Figure 10:
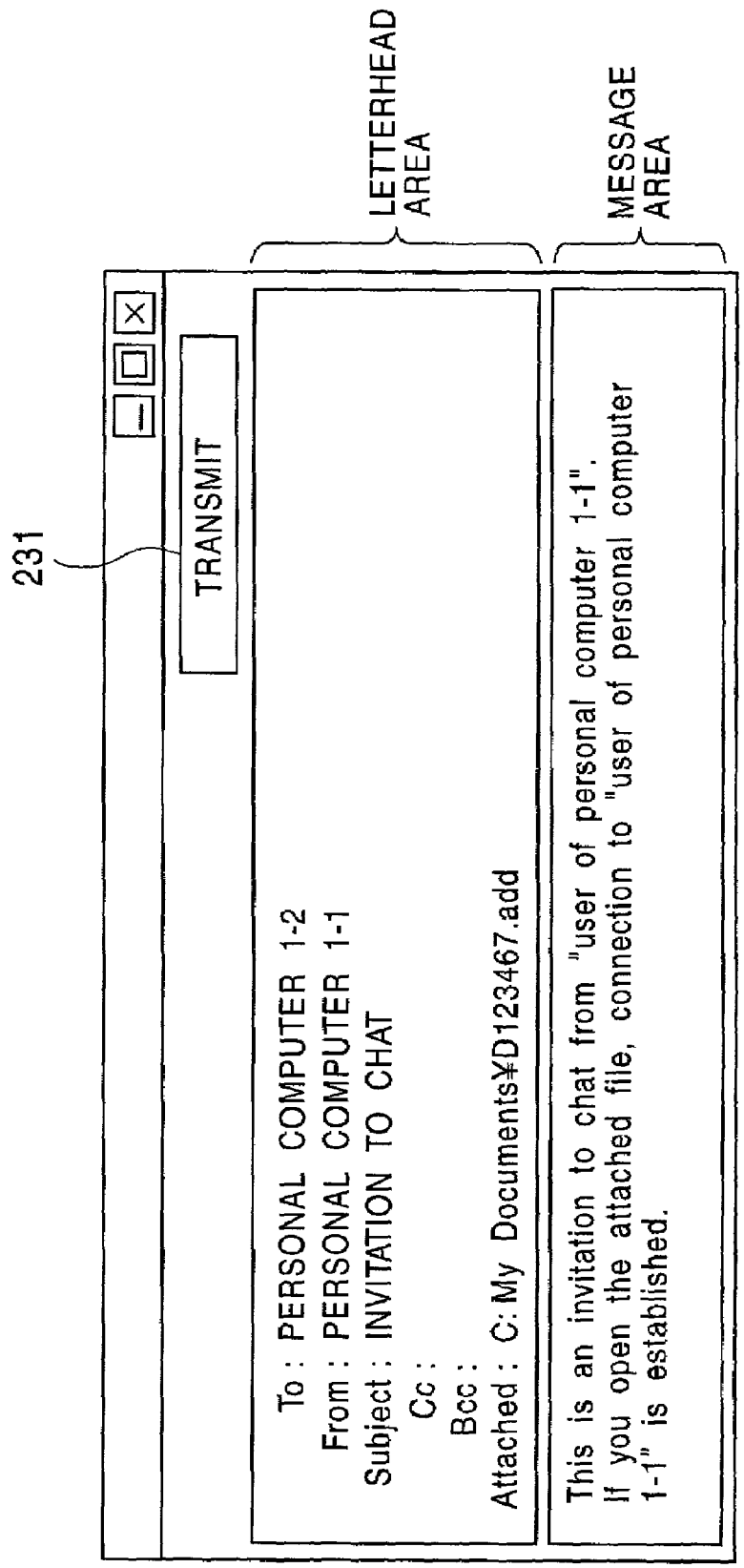
FIG. 10 shows contents of an electronic mail to which an IP address file is attached.

FIG. 10 shows one display example of the electronic mail, which is destined for the personal computer 1-2 and to which the IP address file including the IP address of the personal computer 1-1 described in the encrypted form is attached.

A letterhead area of the electronic mail contains the IP address of the personal computer 1-2 as the destination, the IP address of the personal computer 1-1 as the source, the directory of the IP address file attached to the electronic mail, etc. Also, in the letterhead area, a preset phrase ("Invitation to chat") is described as the subject of the electronic mail.

In a message area of the electronic mail, preset sentences are described (namely, "This is an invitation to chat from user of personal computer 1-1". If you open the attached file, connection to "user of personal computer 1-1" is established).

The user of the personal computer 1-1 can change, for example, the subject of the electronic mail and/or the sentences put in the message area.

In step S9, the electronic mail program 54A waits until a transmit button 231 (FIG. 10) for the electronic mail prepared in step S8 is manipulated. Upon the transmit button 231 being manipulated, the electronic mail program 54A proceeds to step S10 in which the electronic mail prepared in step S8 is transmitted to the destination personal computer (personal computer 1-2 in this example) for which the communication connection is not yet established.

The above-mentioned process for establishing the communication connection is brought to an end when it is determined in step S4 that the communication connection to all of the destination personal computers have been already established (in this example, when it is determined that the communication connection of the personal computers 1-1 with the personal computer 1-2 has been already established), or when the processing of step S10 has been completed.

The operation of the personal computer 1-2 corresponding to the above-described operation of the personal computer 1-1 will be described below with reference to a flowchart of FIG. 11.

In step S21, the CPU of the personal computer 1-2 starts up the communication program. In this example, the communication program of the personal computer 1-2 is started up upon opening of the IP address file, which is attached to the electronic mail (FIG. 10) transmitted from the personal computer 1-1 and in which the IP address of the personal computer 1-1 is described (in the encrypted form).

Then, in step S22, the CPU (communication program) of the personal computer 1-2 decrypts the encrypted IP address (i.e., the IP address of the personal computer 1-1) described in the IP address file.

In step S23, the communication program of the personal computer 1-2 executes processing to establish the communication connection for the peer-to-peer communication with the personal computer 1-1 having the decrypted IP address. At this time, the communication program 54F of the personal computer 1-1 simultaneously executes the processing to establish the communication connection with the personal computer 1-2 in a corresponding relation to the processing of step S23 executed by the communication program of the personal computer 1-2.

Figure 11:
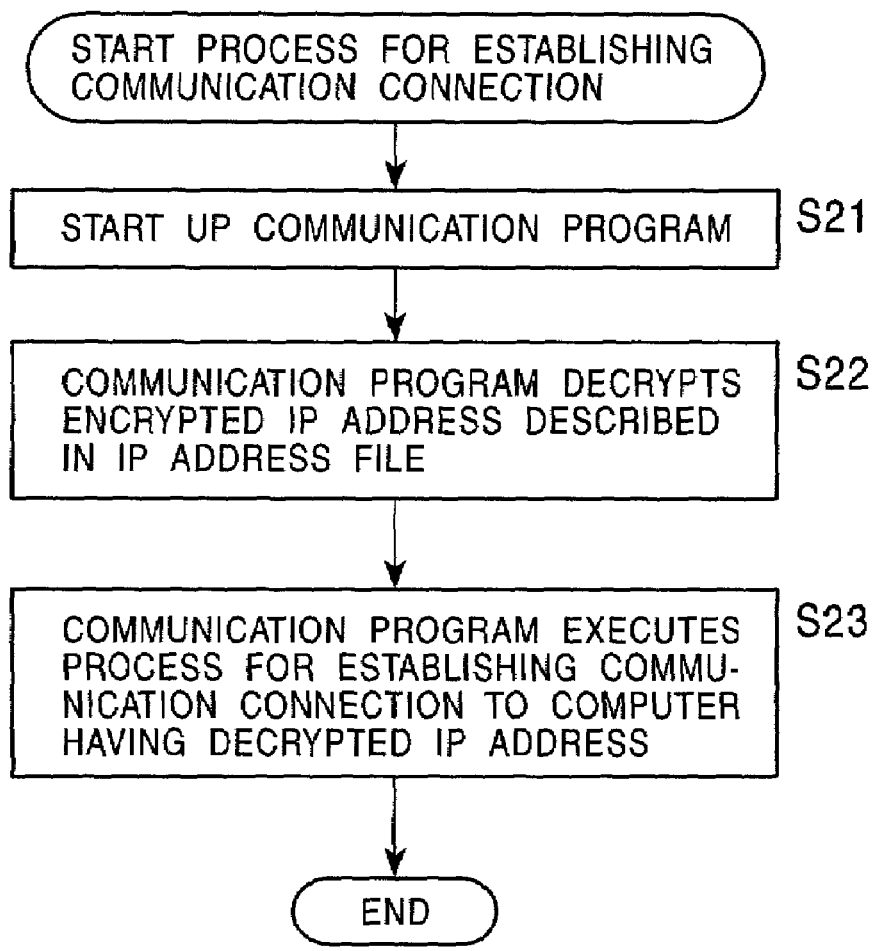
FIG. 11 is a flowchart for explaining the operation of a personal computer 1-2 for establishing communication connection in peer-to-peer communication.

After the completion of step S23, the process shown in FIG. 11 is brought to an end.

Thus, in the communication system to which the present invention is applied, the personal computer is able to establish the communication connection for the peer-to-peer communication just by transmitting its own IP address to the desired destination with which communication is to be made.

Processing procedures for performing communication based on the additional function module will be described below with reference to a flowchart of FIG. 12. A description is first made of, for example, the case in which the peer-to-peer communication is performed between the personal computers 1-1 and 1-2 by utilizing the additional function module for playing the game of "scissors-paper-rock" (called "janken" in Japan and hence referred to as the "'janken' game additional function module" hereinafter) 54G. In this example, it is assumed that the personal computer 1-1 possesses the "janken" game additional function module 67G stored in the HDD 67, but the personal computer 1-2 does not possess that module.

Figure 13:
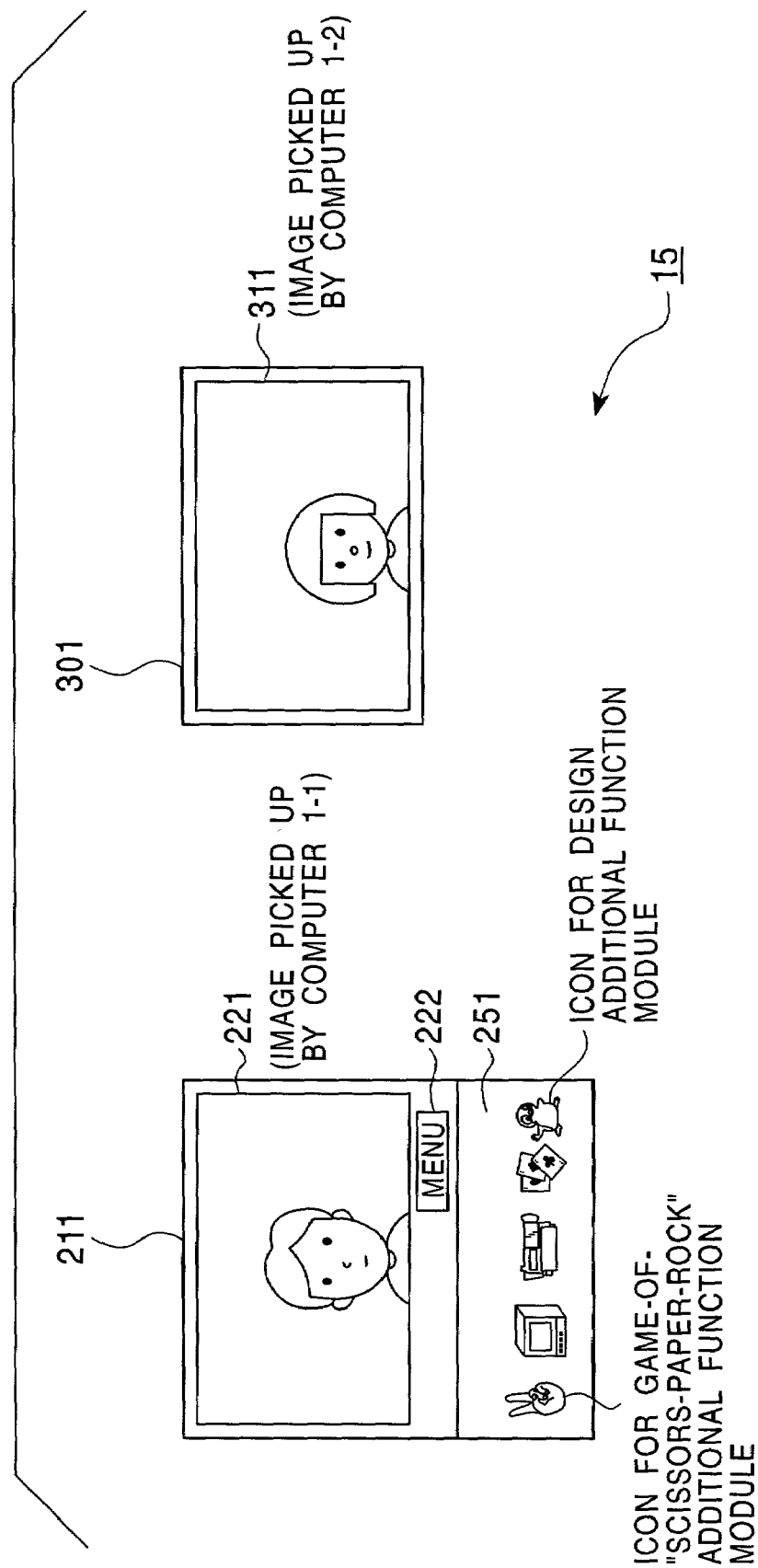
FIG. 13 shows another display example on the LCD of the personal computer 1-1.

Also, it is assumed that the following conditions are held. The communication connection for the peer-to-peer communication is already established between the personal computers 1-1 and 1-2. On the LCD 15 of the personal computer 1-1, as shown in FIG. 13, there are displayed a communication screen 211 having a display area 221 in which an image picked up by the CCD video camera 19 of the personal computer 1-1 and transmitted to the personal computer 1-2 through the peer-to-peer communication is displayed, an additional function module screen 251 on which respective icons for individual additional function modules 67G (including, e.g., an icon of the "janken" game additional function module 67G and an icon of a design additional function module 67G described later) possessed by the personal computer 1-1 are displayed, and a communication screen 301 having a display area 311, etc. in which an image picked up by the personal computer 1-2 and transmitted from the personal computer 1-2 through the peer-to-peer communication is displayed.

Figure 14:
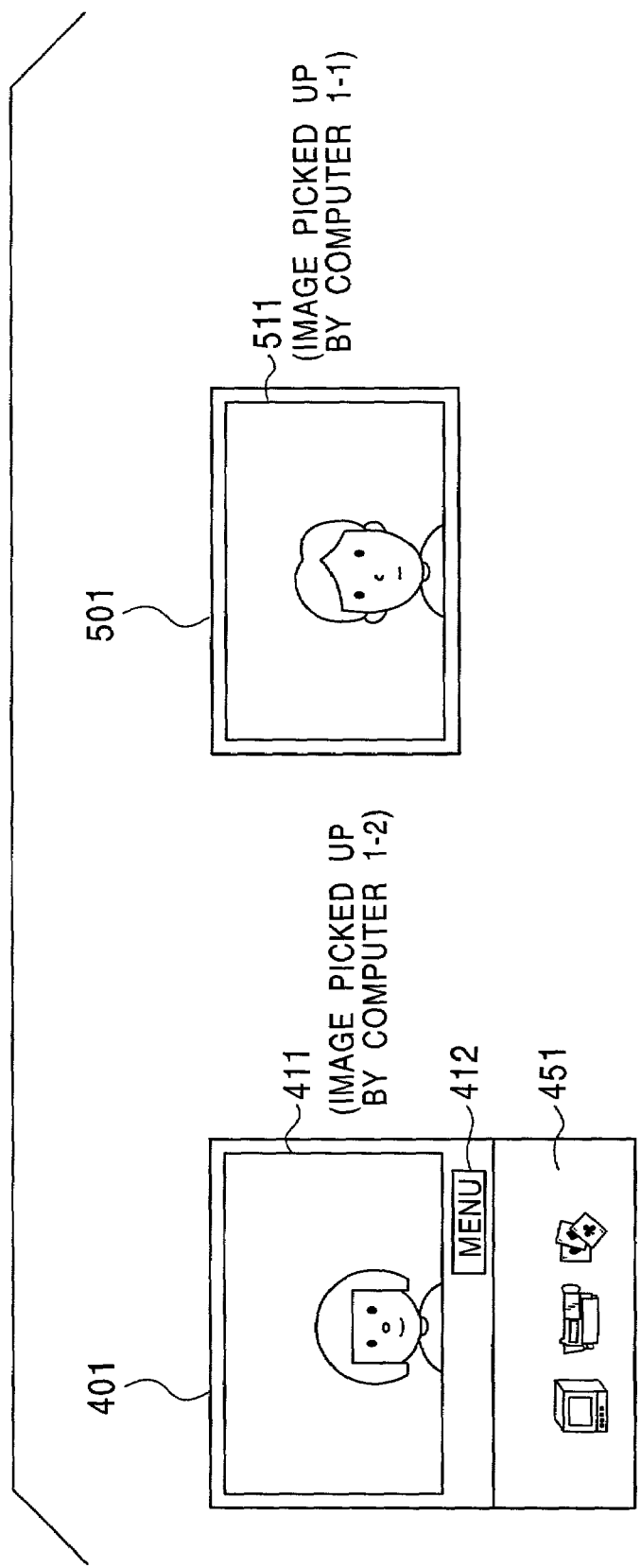
FIG. 14 shows one display example on a display unit of the personal computer 1-2.

On the other hand, it is further assumed that the following conditions are held. On the display unit of the personal computer 1-2, as shown in FIG. 14, there are displayed a communication screen 401 having a display area 411 in which an image picked up by the personal computer 1-2 and transmitted to the personal computer 1-1 through the peer-to-peer communication is displayed, an additional function module screen 451 on which respective icons for individual additional function modules (including neither the icon of the "janken" game additional function module nor the icon of the design additional function module) possessed by the personal computer 1-2 are displayed, and a communication screen 501 having a display area 511, etc. in which an image picked up by the personal computer 1-1 and transmitted from the personal computer 1-1 through the peer-to-peer communication is displayed.

In step S31, the CPU 51 of the personal computer 1-1 loads the communication program 67F from the HDD 67 into the RAM 54, executes the loaded communication program 54F, and then waits until a predetermined event occurs.

Herein, the predetermined event means manipulation made on the icon of any additional function module 67G displayed on the additional function module screen 251 (FIG. 13), or manipulation made on any predetermined representation (described later) corresponding to the additional function module 67G (exactly speaking, the additional function module 54G because the additional function module 67G is loaded in the RAM 54 at that time), or reception of an identifier and display data (described later) both transmitted from the personal computer 1-2. In other words, the communication program 54F of the personal computer 1-2 waits in step S31 until the icon of any additional function module 67G is selected, or until any predetermined representation corresponding to the additional function module 54G is selected, or until the identifier and the display data are received from the personal computer 1-2.

Any one of icons for the additional function modules 67G displayed on the additional function module screen 251 is manipulated by the user when the user wants to begin communication utilizing that additional function module 67G, and any one of predetermined representations corresponding to the additional function module 54G is manipulated by the user when the user wants to execute predetermined processing through the additional function module 54G.

If it is determined in step S31 that the predetermined event has occurred, the process flow proceeds to step S32. In step S32, the communication program 54F of the personal computer 1-1 determines whether the event having occurred in step S31 is caused by manipulation made on the icon of any additional function module 67G, i.e., whether a new request for utilization of the additional function module 67G is issued. If it is determined that a new request for utilization of the additional function module 67G is issued, the process flow proceeds to step S33.

In this example, at this time, the user of the personal computer 1-1 manipulates, e.g., the touch pad 16 and clicks the icon of the "janken" game additional function module 67G displayed on the additional function module screen 251 (FIG. 13). Thus, the event occurred at this time is caused upon manipulation made on the icon of the additional function module 67G (namely, utilization of the "janken" game additional function module 67G is requested), and hence the process flow proceeds to step S33.

In step S33, a process for booting up the additional function module is executed. Details of the process are shown in a flowchart of FIG. 15.

In step S51, the communication program 54F of the personal computer 1-1 loads the additional function module 67G of which icon has been manipulated for selection, i.e., the "janken" game additional function module 67G, from the HDD 67 into the RAM 54.

Then, in step S52, the communication program 54F displays an initial representation of the "janken" game additional function module 54G on the LCD 15 of the display unit 12.

Figure 16:
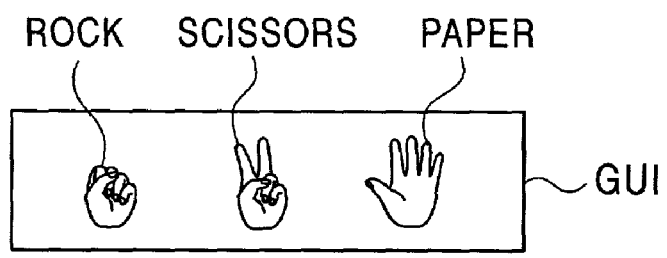
FIG. 16 shows a GUI displayed as an initial state of a game-of-"scissors-paper-rock" additional function module.

FIG. 16 shows one display example of a GUI displayed as the initial representation of the "janken" game additional function module 54G. The GUI comprises an icon of "rock", an icon of "scissors", and an icon of "paper", i.e., icons representing three patterns used in the game of "scissors-paper-rock".

In step S53, the communication program 54F transmits, to the personal computer 1-2, both an identifier of the "janken" game additional function module 54G, which has been loaded from the HDD 67 into the RAM 54 in step S51, and data (display data) indicating the initial representation (FIG. 16) of the "janken" game additional function module 54G.

Figure 12:
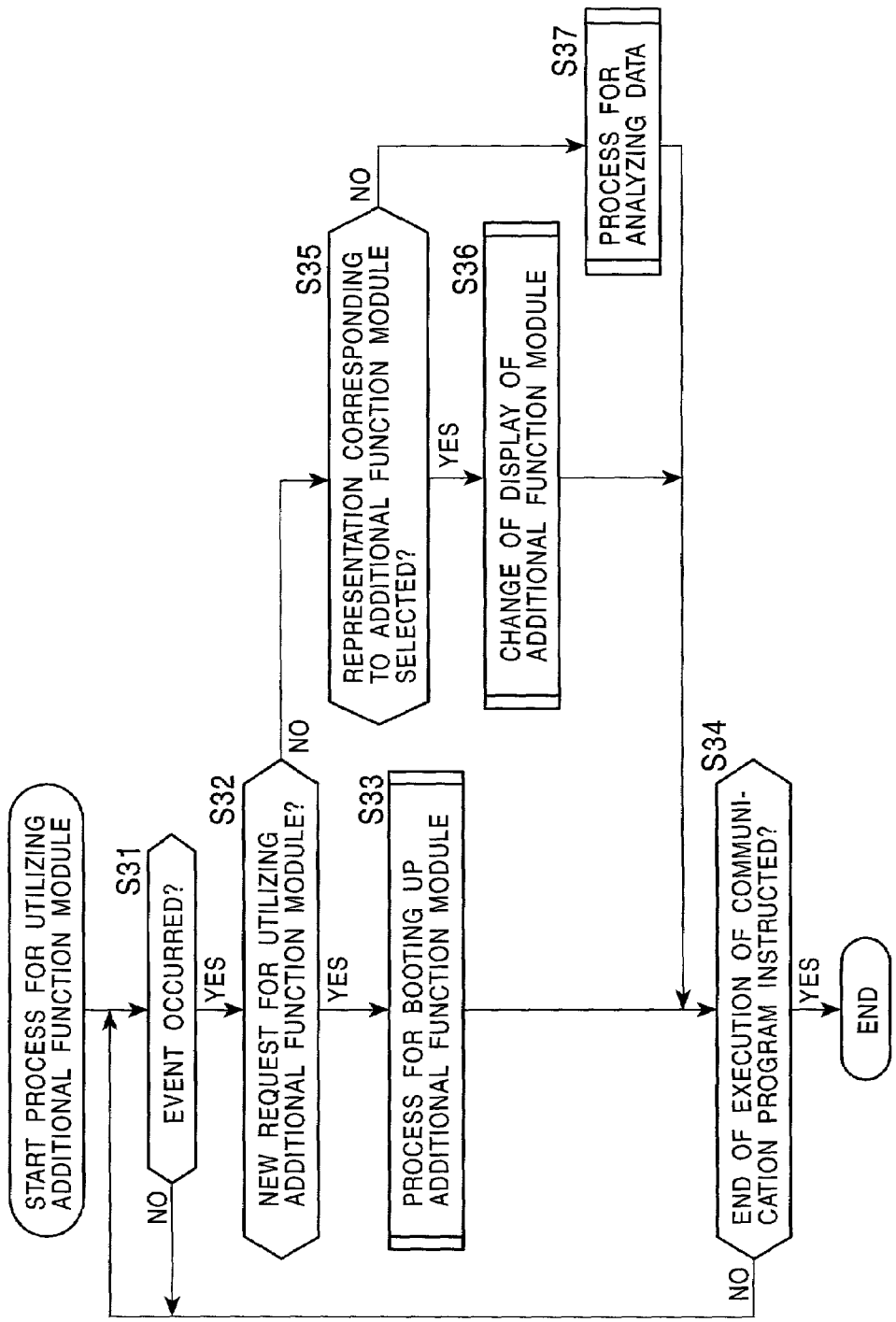
FIG. 12 is a flowchart showing processing procedures when communication is performed using an additional function module.

The process for booting up the additional function module is thereby brought into an end, and the process flow proceeds to step S34 in FIG. 12.

In step S34, the communication program 54F of the personal computer 1-1 determines whether the end of execution of the communication program 54F is instructed. If it is determined that such an instruction is not issued, the process flow returns to step S31 to execute the subsequent processing.

At this time, because the end of execution of the communication program 54F is not instructed in this example, the process flow returns to step S31. Herein, it is assumed in this example that the user of the personal computer 1-1 manipulates, e.g., the touch pad 16 and clicks the icon of "rock" in the GUI, shown in FIG. 16, which is displayed on the LCD 15 with the processing of step S52 in FIG. 15. Therefore, the process flow proceeds to step S35 via steps S31 and S32.

In step S35, the communication program 54F determines whether the event having occurred in step S31 is caused by manipulation made on any predetermined representation corresponding to the additional function module 54G. If it is determined that the event is caused by manipulation made on any predetermined representation corresponding to the additional function module 54G, the process flow proceeds to step S36.

Because selecting (clicking) the icon of "rock" in the GUI of FIG. 16 is manipulation made on one predetermined representation corresponding to the additional function module 54G, the process flow proceeds to step S36 in this example.

In step S36, a process for changing display of the additional function module is executed. Details of that process are shown in a flowchart of FIG. 17.

In step S61, the communication program 54F of the personal computer 1-1 changes a display depending on the manipulation made on any predetermined representation corresponding to the additional function module 54G.

Figure 18:
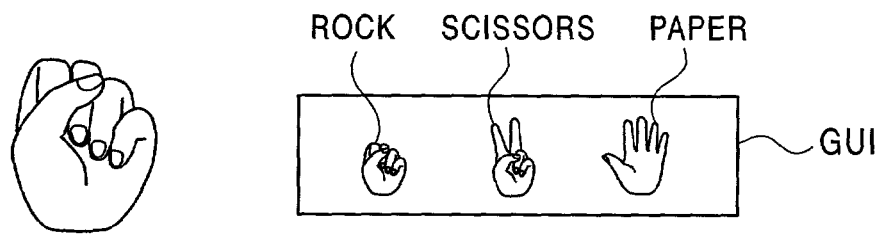
FIG. 18 shows still another display example on the LCD of the personal computer 1-1.

In this example, the representation shown in FIG. 16 is changed to another one shown in FIG. 18 corresponding to selection of the icon of "rock" in the GUI. Specifically, a representation of "rock" is displayed in enlarged scale on the left side of the GUI.

Returning to FIG. 17, in step S62, the communication program 54F transmits, to the personal computer 1-2, both the identifier of the "janken" game additional function module 54G and display data indicating the contents of display (representation shown in FIG. 18) having been changed in step S61. The personal computer 1-2 receives the identifier and the display data transmitted to it.

In step S63, the communication program 54F determines whether the end of utilization of the "janken" game additional function module 54G is instructed. If it is determined that such an instruction is issued, the process flow proceeds to step S64, in which the "janken" game additional function module 54G is unloaded into the HDD 67. The utilization of the "janken" game additional function module 54G is thereby brought to an end.

Figure 17:
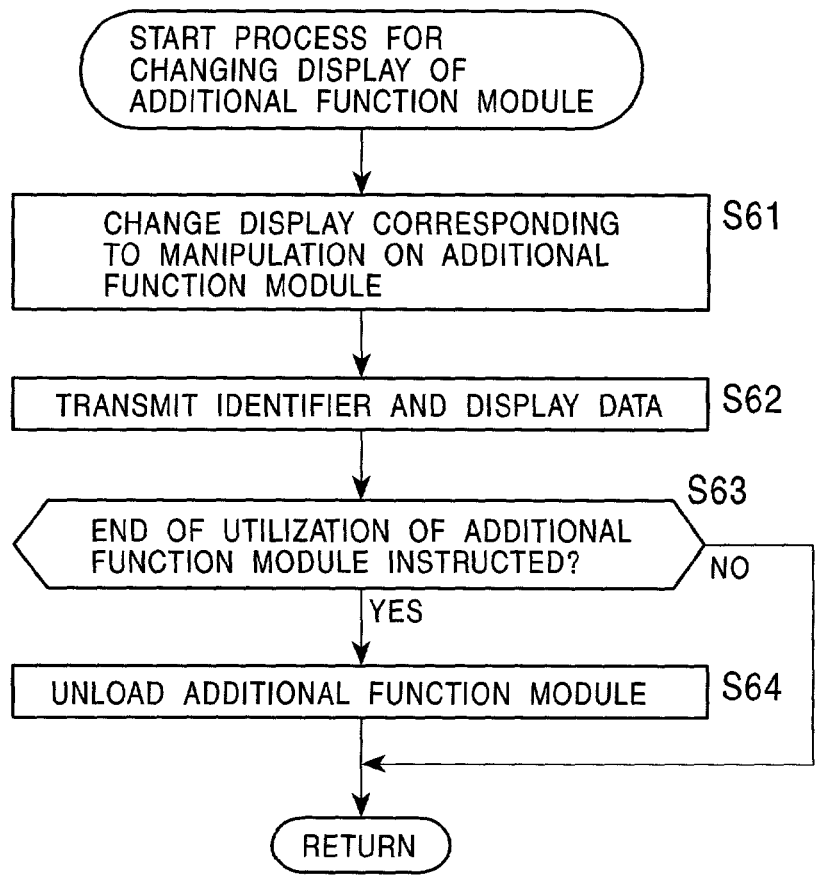
FIG. 17 is a flowchart showing details of processing in step S36 of FIG. 12.

If it is determined in step S63 that the end of utilization of the "janken" game additional function module 54G is not instructed, or if the processing of step S64 has been completed, the processing of step S36 in FIG. 17 is brought to an end and the process flow proceeds to step S34 in FIG. 12.

In this example, because the end of utilization of the "janken" game additional function module 54G is not instructed at that time, the process flow skips step S64 and proceeds to step S34. Also, in this example, because the end of execution of the communication program 54F is not instructed at that time, the process flow returns to step S31.

Further, in this example, because the personal computer 1-1 receives at that time, as described later in more detail, both the identifier (i.e., the identifier of the "janken" game additional function module 54G) and display data (i.e., display data indicating the contents of display corresponding to the manipulation made on the icon of "scissors" in the GUI), which are transmitted from the personal computer 1-2, the process flow proceeds to step S37 via steps S31, S32 and S35.

In step S37, the communication program 54F executes a process for analyzing the received data (identifier and display data). Details of that process are shown in a flowchart of FIG. 19.

In step S71, the communication program 54F of the personal computer 1-1 determines whether the "janken" game additional function module 54G having the received identifier is already loaded in the RAM 54. If it is determined that the "janken" game additional function module 54G is already loaded, the process flow proceeds to step S72.

Figure 15:
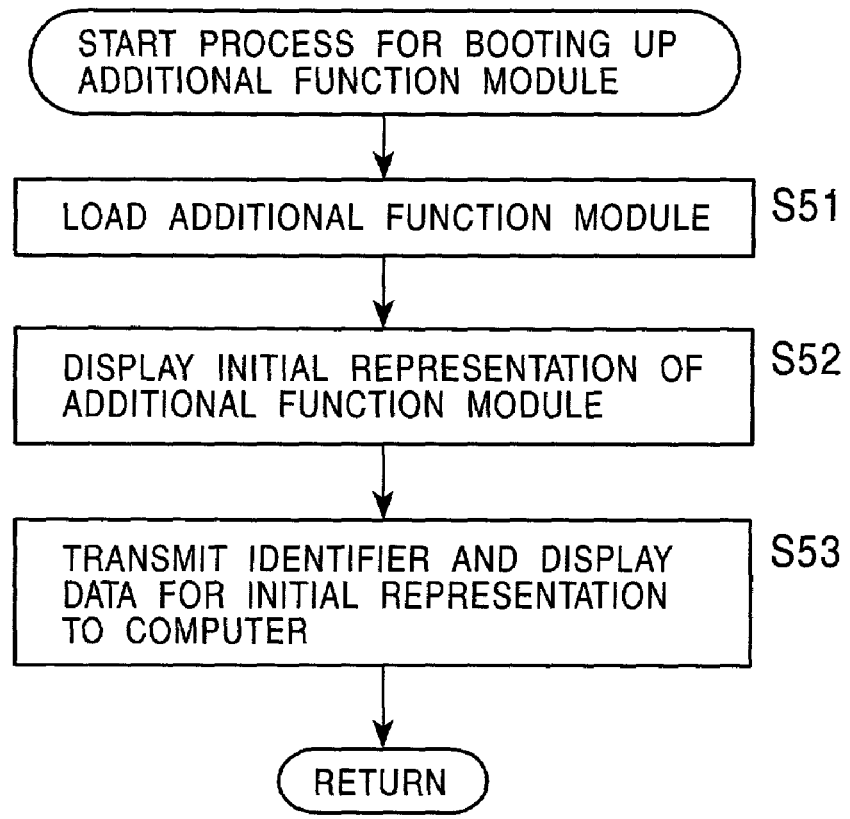
FIG. 15 is a flowchart showing details of processing in step S33 of FIG. 12.

Because the "janken" game additional function module 54G of the personal computer 1-1 is already loaded in the RAM 54 at that time (i.e., because it has been loaded with the processing executed in step S51 of FIG. 15), the process flow proceeds to step S72 in this example.

In step S72, the communication program 54F changes display on the display unit 12 in accordance with the received display data (i.e., display data indicating the contents of display corresponding to the select operation made on the icon of "scissors" in the GUI).

Figure 20:
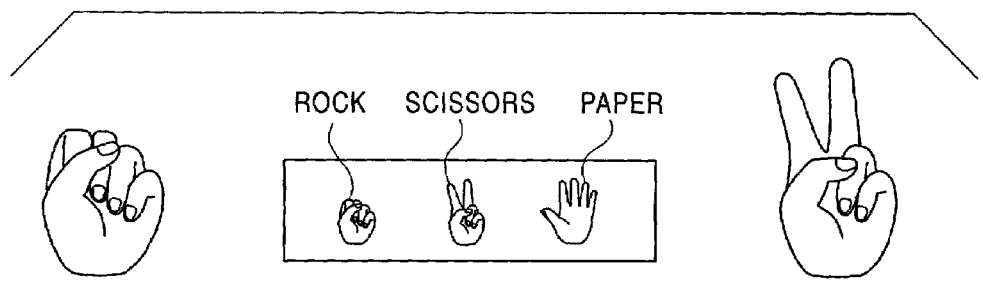
FIG. 20 shows still another display example on an LCD of the personal computer 1-1.

In this example, the representation of FIG. 18 displayed with the above-described processing of step S61 in FIG. 17 is changed as shown in FIG. 20. More specifically, a representation of "scissors" selected by the personal computer 1-2 is displayed in enlarged scale on the right side of the GUI (i.e., on the side opposite to the representation of "rock" selected by the personal computer 1-1).

Then, in step S73, the communication program 54F of the personal computer 1-1 determines whether the end of utilization of the "janken" game additional function module 54G is instructed. If it is determined that such an instruction is issued, the process flow proceeds to step S74, in which the "janken" game additional function module 54G is unloaded into the HDD 67 from the RAM 54.

If it is determined in step S73 that the end of utilization of the "janken" game additional function module 54G is not instructed, or if the processing of step S74 has been completed, the processing of step S36 in FIG. 17 is brought to an end and the process flow proceeds to step S34 in FIG. 12.

The processing executed in steps S75 to S78 will be described later.

Thus, in this example, a representation shown in FIG. 20 is displayed on the LCD 15 of the personal computer 1-1.

The operation of the personal computer 1-2, which corresponds to the above-described operation of the personal computer 1-1 executed when making the peer-to-peer communication based on the "janken" game additional function module 54G, will be described below with reference to the flowchart of FIG. 12. In other words, the personal computer 1-2 also executes the processes shown in the flowcharts of FIGS. 12, 15, 17 and 19 similarly to the personal computer 1-1.

In step S31, the CPU of the personal computer 1-2 loads the communication program from the HDD into the RAM, executes the loaded communication program, and then waits until a predetermined event occurs.

In this example, the personal computer 1-2 receives at that time both the identifier (i.e., the identifier of the "janken" game additional function module 54G) and display data (i.e., GUI display data indicating the initial representation of the "janken" game additional function module 54G), which are transmitted from the personal computer 1-1 with the processing of step S53 in FIG. 15 previously executed by the personal computer 1-1. Therefore, the process flow proceeds to step S37 via steps S31, S32 and S35.

In step S37, the communication program of the personal computer 1-2 executes a process for analyzing the received data (identifier and display data).

Figure 19:
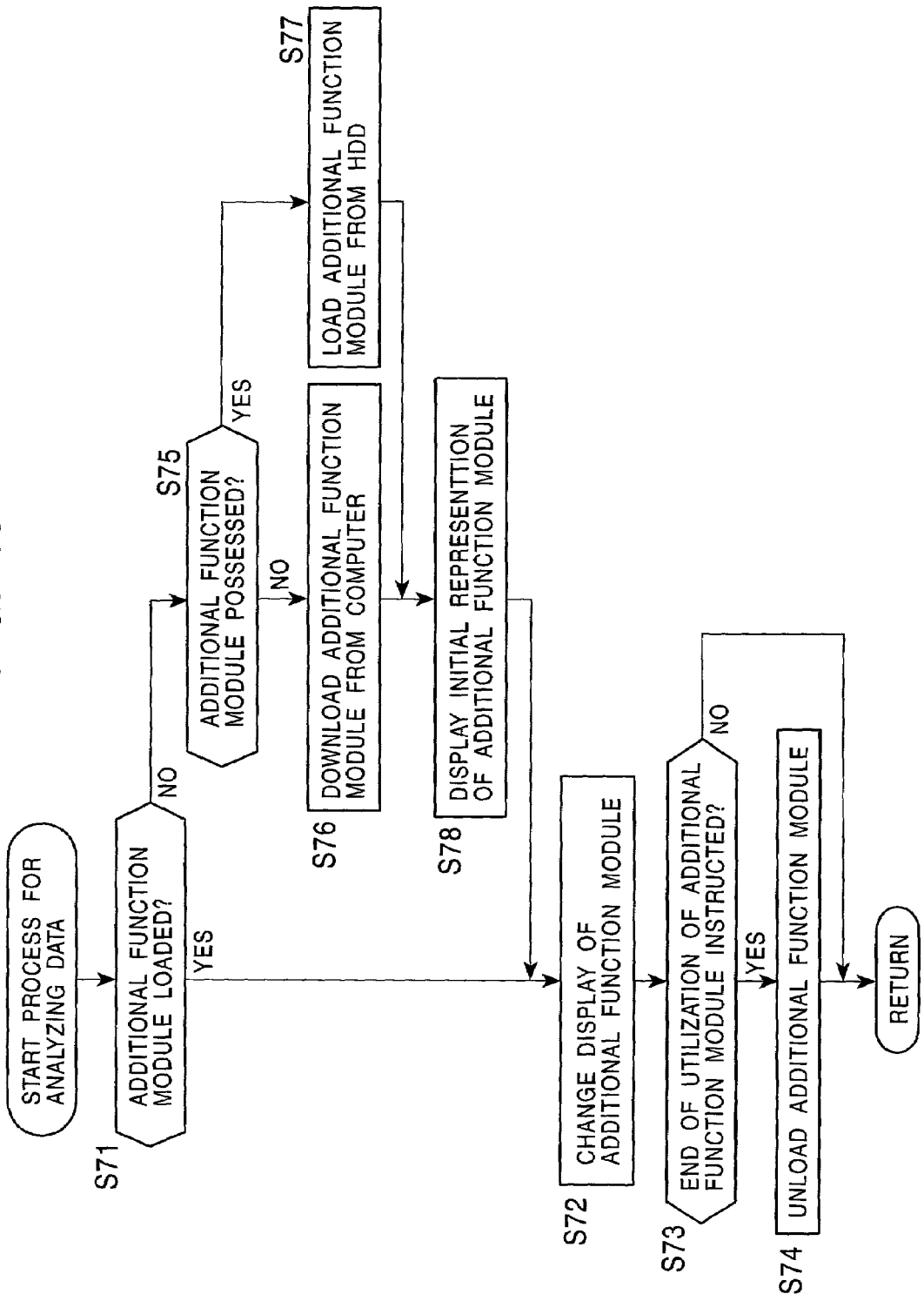
FIG. 19 is a flowchart showing details of processing in step S37 of FIG. 12.

More specifically, in step S71 of FIG. 19, the communication program of the personal computer 1-2 determines whether the "janken" game additional function module 54G having the received identifier is already loaded in the RAM. If it is determined that the "janken" game additional function module 54G is not loaded, the process flow proceeds to step S75.

Because the "janken" game additional function module 54G is not loaded in the RAM of the personal computer 1-2 at that time, the process flow proceeds to step S75 in this example.

In step S75, the communication program of the personal computer 1-2 determines whether the "janken" game additional function module 67G having the received identifier is possessed by the personal computer 1-2. If it is determined that the "janken" game additional function module 54G is not possessed, the process flow proceeds to step S76.

Because the personal computer 1-2 does not possess the "janken" game additional function module 67G, the process flow proceeds to step S76 in this example.

In step S76, the communication program of the personal computer 1-2 communicates with the personal computer 1-1 (i.e., the source from which the identifier of the "janken" game additional function module 54G and the display data have been transmitted) for downloading the "janken" game additional function module 54G from the personal computer 1-1 and then loading it in the RAM of the personal computer 1-2.

On the other hand, for example, when the personal computer 1-2 possesses the "janken" game additional function module 67G, it is determined in step S75 that the "janken" game additional function module 67G is possessed by the personal computer 1-2. Therefore, the process flow proceeds to step S77, in which the communication program of the personal computer 1-2 loads the "janken" game additional function module 67G into the RAM from the HDD thereof.

When the "janken" game additional function module 67G is loaded into the RAM with the processing of step S76 or S77, the process flow proceeds to step S78, in which the communication program of the personal computer 1-2 displays, on the display unit, the GUI (FIG. 16) as the initial representation of the "janken" game additional function module 54G similarly to the case in which the processing of step S52 in FIG. 15 is executed by the personal computer 1-1.

Then, the process flow proceeds to step S72, in which the communication program of the personal computer 1-2 changes display on the display unit in accordance with received display data. In this example, the display data indicating the initial representation of the "janken" game additional function module 54G is received by the personal computer 1-2 at that time, and therefore the initial representation having been displayed with the processing of step S78 is not changed in step S72.

Subsequently, the process flow proceeds to step S73. In this example, because the end of utilization of the "janken" game additional function module 54G is not instructed at that time, the process flow skips step S74 and proceeds to step S34 in FIG. 12. Also, in this example, because the end of execution of the communication program of the personal computer 1-2 is not instructed at that time, the process flow returns to step S31.

In this example, at this time, the user of the personal computer 1-2 manipulates, e.g., the touch pad and clicks the icon of "scissors" in the GUI (FIG. 16), which is displayed on the display unit with the processing of step S78 in FIG. 19. Therefore, the process flow proceeds to step S36 via steps S31, S32 and S35.

Figure 21:
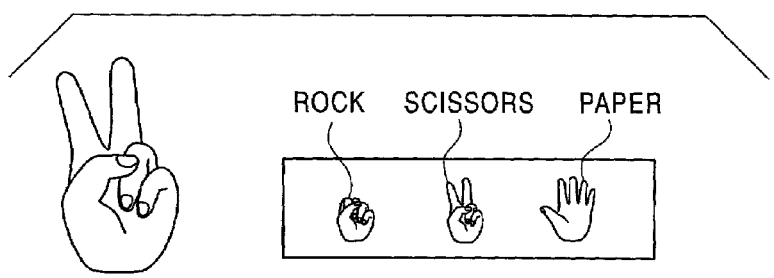
FIG. 21 shows another display example on the display unit of the personal computer 1-2.

More specifically, in step S61 of FIG. 17, the communication program of the personal computer 1-2 changes the representation shown in FIG. 16 to another one shown in FIG. 21 corresponding to the select operation made on the icon of "scissors" in the GUI. Thus, a representation of "scissors" is displayed in enlarged scale on the left side of the GUI.

Then, in step S62, the communication program of the personal computer 1-2 transmits, to the personal computer 1-1, both the identifier of the "janken" game additional function module 54G and display data indicating the contents of display (representation shown in FIG. 21) having been changed in step S61. The personal computer 1-1 receives the identifier and the display data transmitted to it.

Thereafter, the process flow proceeds to step S63. In this example, because the end of utilization of the "janken" game additional function module 54G is not instructed at that time, the process flow skips step S64 and proceeds to step S34 in FIG. 12.

Also, in this example, because the end of execution of the communication program of the personal computer 1-2 is not instructed at that time, the process flow returns to step S31.

Further, in this example, because the personal computer 1-2 receives at that time both the identifier and the display data (i.e., the identifier of the "janken" game additional function module 54G and the display data indicating the contents of display corresponding to the select manipulation made on the icon of "rock" in the GUI, which are transmitted from the personal computer 1-1 with the processing of step S62 in FIG. 17 previously executed by the personal computer 1-1), the process flow proceeds to step S37 via steps S31, S32 and S35.

More specifically, in step S71 of FIG. 19, it is determined whether the "janken" game additional function module 54G is already loaded. Because the "janken" game additional function module 54G, which has been downloaded from the personal computer 1-1 with the previously executed processing of step S76, is already loaded in the RAM of the personal computer 1-2 at that time, the process flow proceeds to step S72.

In step S72, the communication program of the personal computer 1-2 changes display of the "janken" game additional function module 54G on the display unit in accordance with the received image data (i.e., the image data indicating the contents of display corresponding to the select manipulation made on the icon of "rock" in the GUI).

Figure 22:
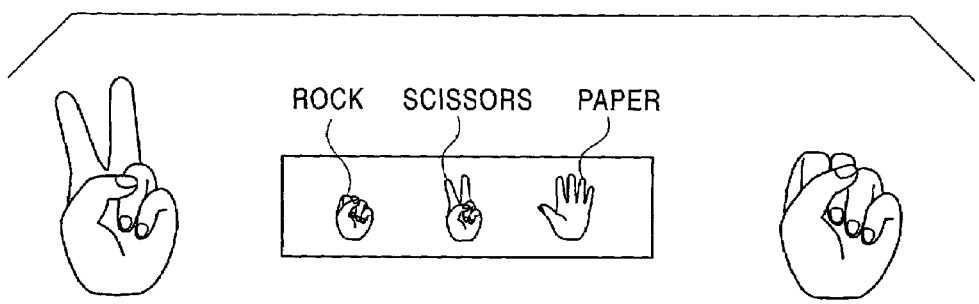
FIG. 22 shows still another display example on the display unit of the personal computer 1-2.

In this example, the representation of FIG. 21 having been displayed with the previously executed processing of step S61 in FIG. 17 is changed as shown in FIG. 22. More specifically, the representation of "rock" selected by the personal computer 1-1 is displayed in enlarged scale on the right side of the GUI (i.e., on the side opposite to the representation of "scissors" selected by the personal computer 1-2).

Eventually, in this example, the representation shown in FIG. 22 is displayed on the display unit of the personal computer 1-2.

As described above, each of the personal computers 1-1 and 1-2 displays screens representing one of the patterns used in the game of "scissors-paper-rock", which has been selected by itself, and one of the patterns used in the game of "scissors-paper-rock", which has been selected by the counterpart. Therefore, the personal computers 1-1 and 1-2 are able to play the game of "scissors-paper-rock".

Processing procedures for communication based on the design additional function module 54G will be described below with reference to again the flowchart of FIG. 12.

By utilizing the design additional function module 54G in communication, the personal computer 1-1, for example, is able to display, in the designed form of a penguin, a frame of each of the communication screen 211 (FIG. 13) and the communication screen 501 (FIG. 14), which are displayed on the LCD 15 of the personal computer 1-1 and the display unit of the personal computer 1-2, respectively, and which display the state of the user of the personal computer 1-1.

In this example, as with the above-described case, it is assumed that the personal computer 1-1 possesses the design additional function module 67G, but the personal computer 1-2 as the counterpart in communication does not possess that module.

Also, it is assumed that the communication connection for the peer-to-peer communication is already established between the personal computers 1-1 and 1-2, the screen shown in FIG. 13 is displayed on the LCD 15 of the personal computer 1-1, and the screen shown in FIG. 14 is displayed on the display unit of the personal computer 1-2.

In this example, at this time, the user of the personal computer 1-1 manipulates, e.g., the touch pad 16 and clicks the icon of the design additional function module 67G, which is displayed on the additional function module screen 251 (FIG. 13). Therefore, the process flow proceeds to step S33 via steps S31 and S32.

In step S33, the process for booting up the additional function module is executed. More specifically, in step S51 of FIG. 15, the communication program 54F of the personal computer 1-1 loads the additional function module 67G of which icon has been manipulated for selection, i.e., the design additional function module 67G, from the HDD 67 into the RAM 54.

Then, in step S52, the communication program 54F displays an initial representation of the design additional function module 54G on the LCD 15 of the display unit 12.

Figure 23:
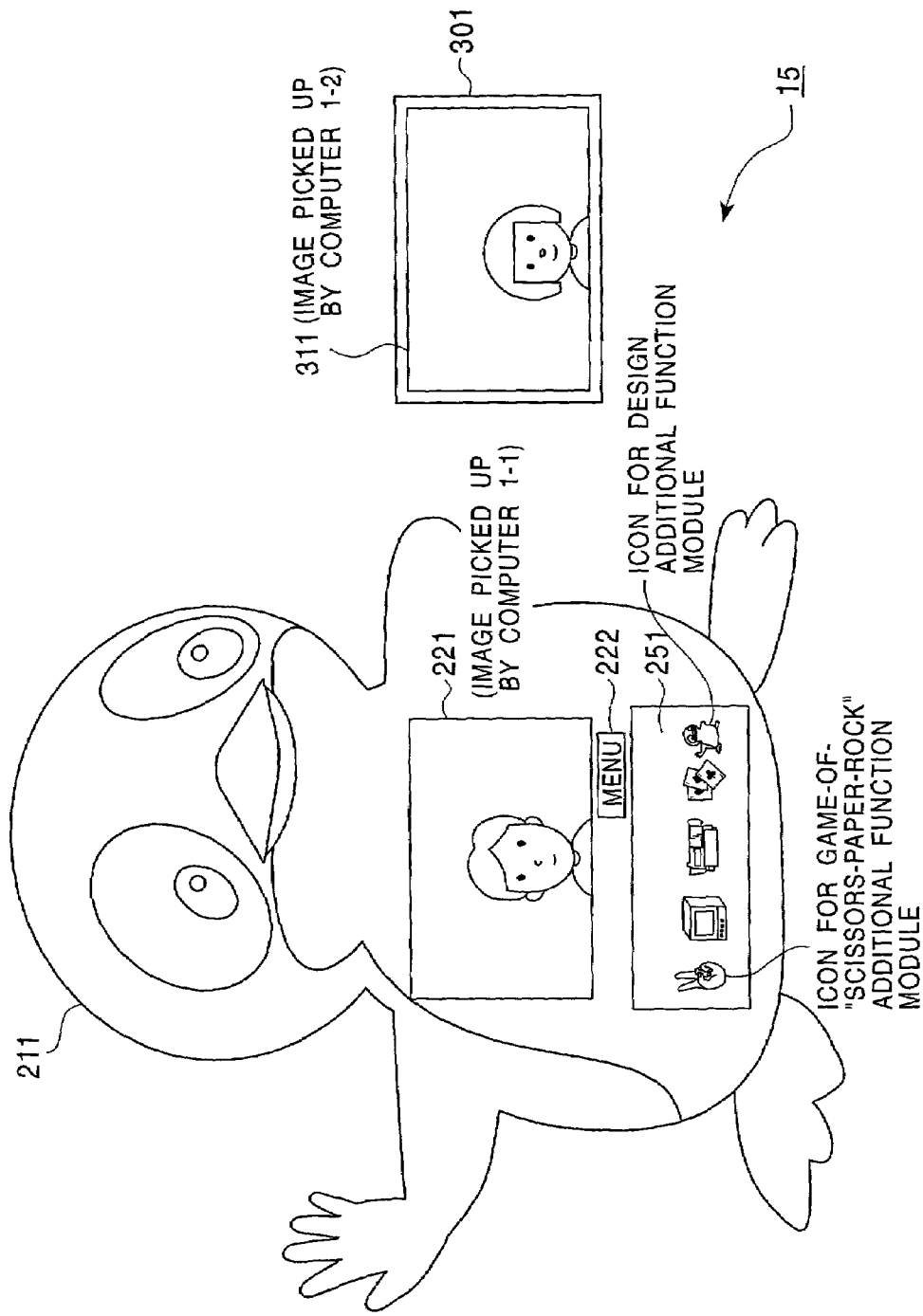
FIG. 23 shows still another display example on the LCD of the personal computer 1-1.

FIG. 23 shows one display example of the communication screen 211 displayed as the initial representation of the design additional function module 54G. Specifically, the communication screen 211 is displayed in the designed form of a penguin.

In step S53, the communication program 54F transmits, to the personal computer 1-2, both an identifier of the design additional function module 54G, which has been loaded from the HDD 67 into the RAM 54 in step S51, and display data indicating the initial representation of the design additional function module 54G (in this example, display data indicating the contents of display (designed form of a penguin) on the communication screen 211).

The process for booting up the additional function module is thereby brought into an end, and the process flow proceeds to step S34 in FIG. 12.

The processing subsequent to step S34 is the same as that in the case of utilizing the "janken" game additional function module 54G, and hence a description thereof is omitted.

The operation of the personal computer 1-2, which corresponds to the above-described operation of the personal computer 1-1 executed when making the peer-to-peer communication based on the design additional function module 54G, will be described below with reference to the flowchart of FIG. 12.

In this example, at this time, the CPU (communication program) of the personal computer 1-2 receives at that time both the identifier and the display data (i.e., the identifier of the design additional function module 54G and the display data indicating the contents of display on the communication screen 211), which are transmitted from the personal computer 1-1 with the processing of step S53 in FIG. 15 previously executed by the personal computer 1-1. Therefore, the process flow proceeds to step S37 via steps S31, S32 and S35.

More specifically, in step S71 of FIG. 19, the communication program of the personal computer 1-2 determines whether the design additional function module 54G having the received identifier is loaded in the RAM. If it is determined that the design additional function module 54G is not loaded, the process flow proceeds to step S75.

Because the design additional function module 54G is not loaded in the RAM of the personal computer 1-2 at that time, the process flow proceeds to step S75. In this example, the personal computer 1-2 does not possess the design additional function module 54G, and hence the process flow further proceeds to step S76.

In step S76, the communication program of the personal computer 1-2 communicates with the personal computer 1-1 (i.e., the source from which the identifier of the design additional function module 54G and the display data have been transmitted) for downloading the design additional function module 67G from the personal computer 1-1 and loading it in the RAM of the personal computer 1-2.

Figure 24:
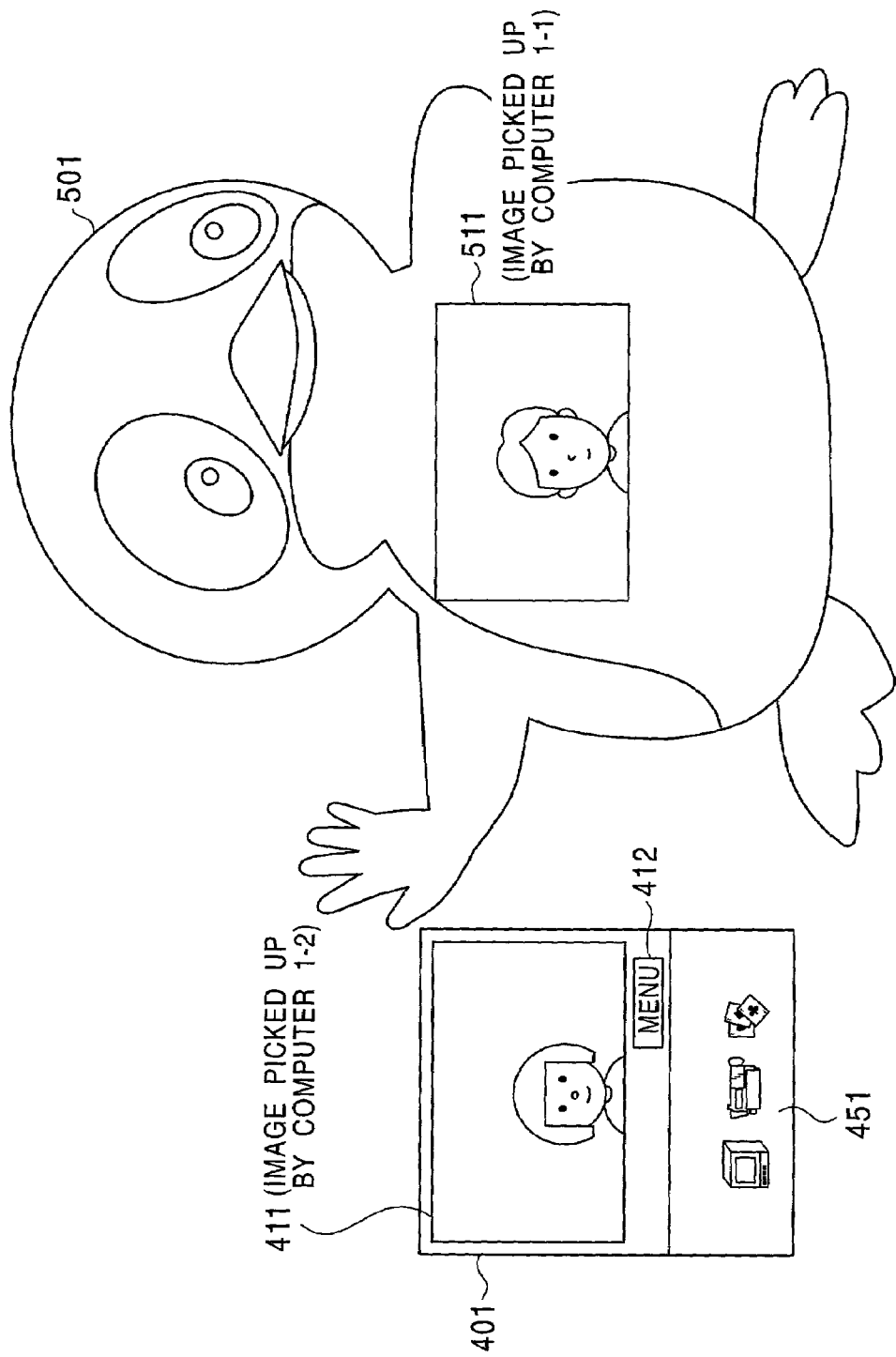
FIG. 24 shows still another display example on the display unit of the personal computer 1-2.

Then, in step S78, the communication program of the personal computer 1-2 displays the initial representation of the design additional function module 54G on the display unit. In other words, with the processing of step S78, the communication screen 501, which is displayed on the display unit of the personal computer 1-2 and includes the display area 511 where the image picked up by the personal computer 1-1 is displayed, is displayed in the designed form of a penguin as shown in FIG. 24.

After that, the process flow proceeds to step S72. The processing subsequent to step S72 is the same as that in the case of utilizing the "janken" game additional function module 54G, and hence a description thereof is omitted.

Thus, even when only the personal computer 1-1 possesses the design additional function module 67G, the communication screen 501, which is displayed on the side of the personal computer 1-2 and displays the image picked up by the personal computer 1-1, can be displayed in the designed form of a penguin similarly to the communication screen 211.

While the above description has been made of, by way of example, the case of utilizing the personal computer 1 as a terminal, a cellular phone can also be utilized as a terminal.

A series of processes described above can be executed using not only hardware, but also software. In the case of executing the series of processes using software, a program constituting the software is installed from a program recording or storage medium into, for example, a computer built in a dedicated unit of hardware or a universal personal computer that is able to execute various functions by installing various programs therein.

Figure 7:
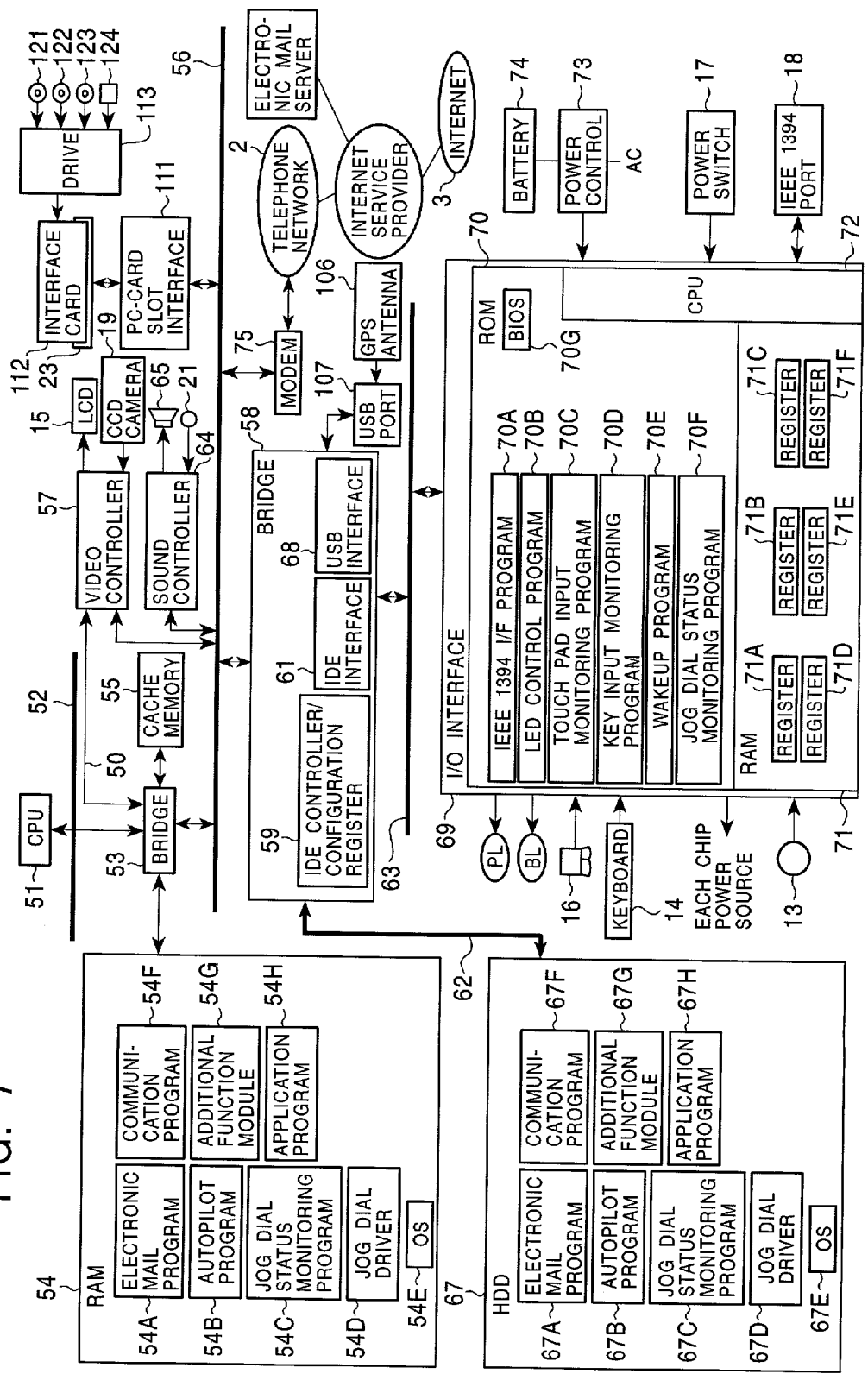
FIG. 7 is a block diagram showing one example of an internal configuration of the personal computer 1-1.

As shown in FIG. 7, the program recording medium is constituted by a package medium, such as a magnetic disk 121 (including a floppy disk), an optical disk 122 (including a CD-ROM (Compact Disk-Read Only Memory) and a DVD (Digital Versatile Disk)), a magneto-optical disk 123 (including an MD (Mini-Disk)), and a semiconductor memory 124, on which the program is recorded and which is distributed to the user separately from the computer for providing the program. Alternatively, the program recording medium may be, e.g., the HDD 67 that contains the program stored therein and is provided to the user in a state previously built in the computer.

It is to be noted that the steps explained in this specification and describing the program provided from a recording medium can be implemented with not only time-serial processing that is executed in the order explained, but also processing other than the time-serial one, i.e., processing that is executed in parallel or individually in parts.

Also, note that the term "system" used in this specification means the whole of apparatus as a combination of plurality of devices and units.

What is claimed is:

1. An information processing apparatus for transmitting an electronic mail message to a destination to establish communications via a network by utilizing an electronic mail address corresponding to said destination to establish communications, said information processing apparatus comprising:

means for retrieving an IP address of said information processing apparatus from a memory of said information processing apparatus;

means for encrypting said IP address of said information processing apparatus;

means for creating an electronic mail message including said encrypted IP address of said information processing apparatus;

means for transmitting the created electronic mail message to the destination to establish communications using said electronic mail address corresponding to said destination to establish communications; and means for establishing a peer-to-peer connection between said information processing apparatus and said destination when said destination accesses said IP address of said information processing apparatus to establish communications.

2. An information processing method used in an information processing apparatus for transmitting an electronic mail message to a destination to establish communications via a network by utilizing an electronic mail address corresponding to said destination to establish communications, said information processing method comprising:

retrieving an IP address of said information processing apparatus from a memory of said information processing apparatus;

encrypting said IP address of said information processing apparatus;

creating an electronic mail message including said encrypted IP address of said information processing apparatus;

transmitting the created electronic mail message to said destination to establish communications using said electronic mail address corresponding to said destination to establish communications; and establishing a peer-to-peer connection between said information processing apparatus and said destination when said destination accesses said IP address of said information processing apparatus to establish communications.

3. A recording medium product on which a computer-readable program is recorded, the program being used with an information processing apparatus for transmitting an electronic mail message to a destination to establish communications via a network by utilizing an electronic mail address corresponding to said destination to establish communications, the program comprising the steps of:

retrieving an IP address of said information processing apparatus from a memory of said information processing apparatus;

encrypting said IP address of said information processing apparatus;

creating an electronic mail message including said encrypted IP address of said information processing apparatus;

transmitting the created electronic mail message to said destination to establish communications using said electronic mail address corresponding to said destination to establish communications; and establishing a peer-to-peer connection between said information processing apparatus and said destination when said destination accesses said IP address of said information processing apparatus to establish communications.

4. An information processing apparatus for transmitting an electronic mail message to a destination to establish communications via a network by utilizing an electronic mail address corresponding to said destination to establish communications, the information processing apparatus comprising:

a module configured to retrieve an IP address of said information processing apparatus from a memory of said information processing apparatus;

an encrypting unit configured to encrypt said IP address of said information processing apparatus;

a module configured to create an electronic mail message including said encrypted IP address of said information processing apparatus;

an interface configured to transmit the created electronic mail message to said destination to establish communications using said electronic mail address corresponding to said destination to establish communications; and a module configured to establish a peer-to-peer connection between said information processing apparatus and said destination when said destination accesses said IP address of said information processing apparatus to establish communications.

5. An information processing apparatus for receiving an electronic mail message, which is transmitted from another information processing apparatus via a network by utilizing an electronic mail address corresponding to said information processing apparatus, said information processing apparatus comprising:

means for receiving the electronic mail message transmitted from said another information processing apparatus via said network, said electronic mail message including a file containing an encrypted IP address of said another information processing apparatus;

means for decrypting said IP address included in said file; and means for establishing peer-to-peer communication with said another information processing apparatus by accessing said decrypted IP address of said another information processing apparatus.

6. An information processing method used in an information processing apparatus for receiving an electronic mail message, which is transmitted from another information processing apparatus via a network by utilizing an electronic mail address corresponding to said information processing apparatus, said information processing method comprising:

receiving the electronic mail message transmitted from said another information processing apparatus via said network, said electronic mail message including a file containing an encrypted IP address of said another information processing apparatus;

decrypting said IP address included in said file; and establishing peer-to-peer communication with said another information processing apparatus by accessing said decrypted IP address of said another information processing apparatus.

7. A recording medium product on which a computer-readable program is recorded, the program being used with an information processing apparatus for receiving an electronic mail message, which is transmitted from another information processing apparatus via a network by utilizing an electronic mail address corresponding to said information processing apparatus, the program comprising the steps of:

receiving the electronic mail message transmitted from said another information processing apparatus via said network, said electronic mail message including a file containing an encrypted IP address of said another information processing apparatus;

decrypting said IP address included in said file; and establishing peer-to-peer communication with said another information processing apparatus by accessing said decrypted IP address of said another information processing apparatus.

8. An information processing apparatus for receiving an electronic mail message, which is transmitted from another information processing apparatus via a network by utilizing an electronic mail address corresponding to said information processing apparatus, the information processing apparatus comprising:

an interface configured to receive the electronic mail message transmitted from said another information processing apparatus via said network, said electronic mail message including a file containing an encrypted IP address of said another information processing apparatus;

a module configured to decrypt said IP address included in said file; and a module configured to establish peer-to-peer communication with said another information processing apparatus by accessing said decrypted IP address of said another information processing apparatus.

* * * * *